United States Patent [19]
Takahashi

[11] Patent Number: 6,154,314
[45] Date of Patent: Nov. 28, 2000

[54] REAL IMAGE MODE VARIABLE MAGNIFICATION FINDER

[75] Inventor: Toshio Takahashi, Hachioji, Japan

[73] Assignee: Olympus Optical Co., Ltd., Tokyo, Japan

[21] Appl. No.: 09/218,524

[22] Filed: Dec. 22, 1998

[30] Foreign Application Priority Data

Dec. 26, 1997 [JP] Japan .................................. 9-359207

[51] Int. Cl.$^7$ .................................................. G02B 23/00
[52] U.S. Cl. .......................... 359/432; 359/431; 359/689
[58] Field of Search .......................... 359/362, 420–422, 359/431–433, 676–678, 689, 784; 396/373–386

[56] References Cited

U.S. PATENT DOCUMENTS

| | | | |
|---|---|---|---|
| 5,231,534 | 7/1993 | Kato | 359/432 |
| 5,701,199 | 12/1997 | Takatao | 359/422 |
| 5,757,543 | 5/1998 | Ogata | 359/422 |
| 5,815,312 | 9/1998 | Takato | 359/422 |
| 5,920,427 | 7/1999 | Ogata | 359/422 |

FOREIGN PATENT DOCUMENTS

| | | |
|---|---|---|
| 64-65520 | 3/1989 | Japan . |
| 5-346610 | 12/1993 | Japan . |
| 6-51201 | 2/1994 | Japan . |
| 8-240769 | 9/1996 | Japan . |

*Primary Examiner*—Thong Nguyen
*Attorney, Agent, or Firm*—Pillsbury Madison & Sutro LLP

[57] ABSTRACT

A real image mode variable magnification finder includes, in order from an object side, an objective optical system with positive power, having at least three lens units; an image erecting device; and an ocular optical system with positive power. This finder also satisfies the following condition:

$$0.1 \geq \beta_W Z/D_W \geq 0.080$$

where $\beta_W$ is a magnification at a wide-angle position of the finder, Z is the variable magnification ratio of the finder, and $D_W$ is an axial distance, in millimeters, from the object-side surface of the first lens unit of the objective optical system to the pupil-side surface of the third lens unit thereof at the wide-angle position of the finder. In this way, the real image mode variable magnification finder which Is small in size, high in magnification, large in angle of emergence, and easy to observe can be provided.

13 Claims, 17 Drawing Sheets

SPHERICAL ABERRATION
φ=4mm

ASTIGMATISM
ω=25.94°

DISTORTION
ω=25.94°

SPHERICAL ABERRATION
φ=4mm

ASTIGMATISM
ω=17.27°

DISTORTION
ω=17.27°

SPHERICAL ABERRATION
φ=4mm

ASTIGMATISM
ω=10.38°

DISTORTION
ω=10.38°

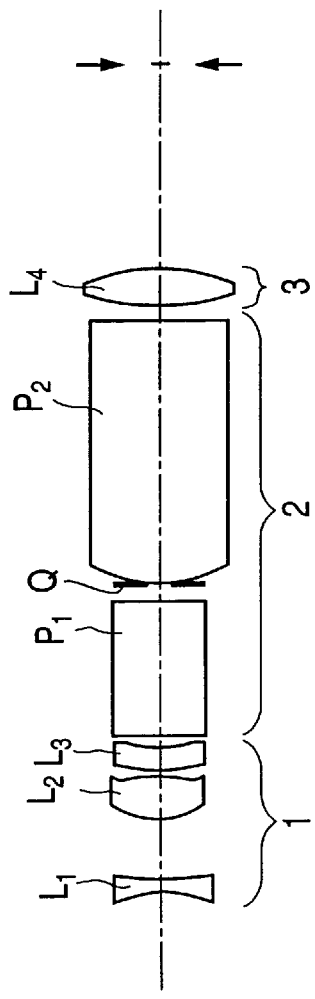
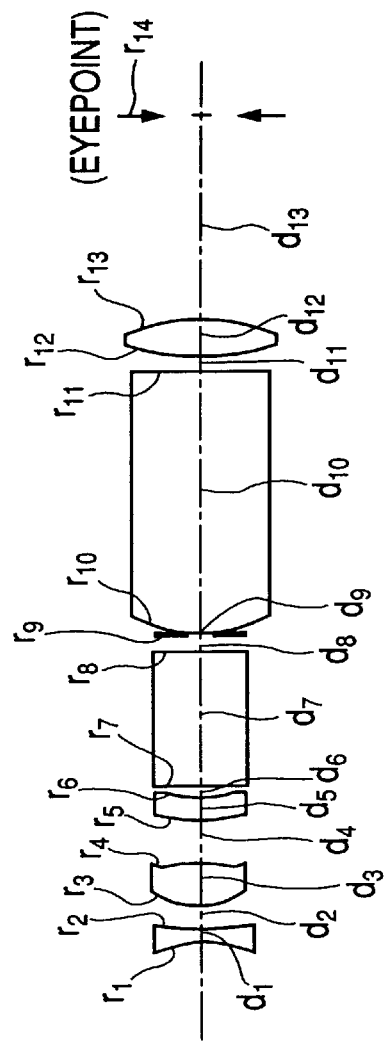
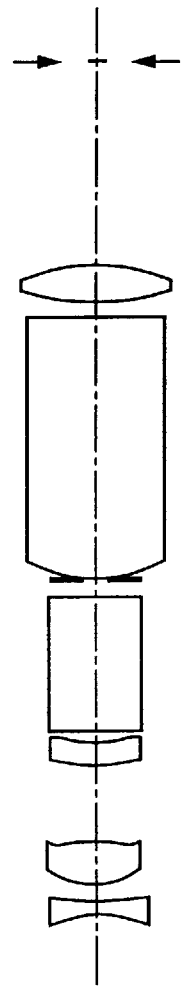
FIG. 18A
FIG. 18B
FIG. 18C

REAL IMAGE MODE VARIABLE MAGNIFICATION FINDER

BACKGROUND OF THE INVENTION

1. Field of the Invention

This invention relates to a real image mode variable magnification finder which is suitable for use in a lens shutter camera or an electronic still camera in which a finder optical system is constructed to be independent of a photographing optical system, and in particular, to a finder which has a high magnification and a large angle of emergence and is most suitable for mounting in a compact camera.

2. Description of Related Art

In general, finders used in lens shutter cameras in which a finder optical system is constructed to be independent of a photographing optical system are roughly divided into two classes: virtual image mode finders and real image mode finders. In the case where a finder has a variable magnification function and requires some degree of magnification at its telephoto position, the virtual image mode finder has the disadvantage that the diameter of a front lens must be enlarged, which constitutes an obstacle to compactness of the camera. The real image mode finder, in contrast with this, is such that its entrance pupil can be located on the object side of the finder optical system and thus the diameter of the front lens can be diminished. In this way, the real image mode finders are used nowadays in many lens shutter cameras having variable magnification functions As lens shutter cameras have become more compact in recent years, a finder mounted in the camera must also be downsized. In this case, the problem arises that if the power of a magnifier is increased to downsize an ocular optical system, dust particles lying in the vicinity of a field frame are also seen in sharp focus. Specifically, the focal length of the objective optical system is reduced due to the compactness, and with this, the design of a finder having low magnification has been promoted. Consequently, although compactness of the camera has been accomplished, the problem is raised that the field of the finder becomes smaller and thus it is difficult to observe a subject.

As one of requirements for a finder which is easy to use, a large angle of view of emergence of the finder is needed. This is because a finder with a large angle of view of emergence enables a photographer to have immediately an actual feeling of seeing a wide observation image plane of the finder.

As another requirement, a high magnification of the finder is needed. In particular, it is important that the variable magnification finder has a high magnification at its wide-angle position.

A compact camera is usually designed so that the finder is set at the wide-angle position immediately after a power source is turned on or when it is off. Since the area of view is wide, the photographer first sees an observation area at the wide-angle position and then begins to photograph. That is, the observation area of the finder at the wide-angle position is a reference image plane that he can look out over the entire photographic area available when the magnification is changed. In this way, the photographer first observes the image plane at the wide-angle position to change the magnification or consider the composition of a picture. In a finder such that a variable magnification ratio is particularly high, for example, more than 2, when the composition of a picture at the telephoto position is considered at the wide-angle position, an object image assumed as the composition of a picture at the telephoto position is relatively small if the magnification at the wide-angle position is low. Moreover, since the area of the object image thus available is narrow, the composition of a picture is difficult, and such a finder is inconvenient for use.

In order to increase the angle of emergence and the magnification of the finder, the finder itself must be enlarged under conventional design techniques. In a large-sized finder, the power of each lens unit is weak and its fabrication is easy. Such a finder, however, can be used in a large-sized camera only.

For these reasons, a finder which equally supplies three requirements that the angle of emergence is large, the magnification is high, and the size is small has never been provided.

Also, a finder having a relatively large angle of emergence is disclosed, for example, in Japanese Patent Preliminary Publication No. Hei 6-51201. On the other hand, a finder having a high magnification at the wide-angle position is disclosed, for example, in Japanese Patent Preliminary Publication No. Sho 64-65520.

However, in the finder set forth in Hei 6-51201, the angle of emergence is large, but the finder magnification at the wide-angle position is as low as 0.35×, and thus the object image within the finder field at the wide-angle position diminishes in size. Furthermore, the entire length of the finder is as long as 67 mm or more, thus, compactness is not achieved. Prisms are constructed of materials with high refractive indices and thus are high in cost.

On the other hand, in the finder disclosed in Sho 64-65520, the finder magnification at the wide-angle position is as high as 0.564×, but the entire optical system is extremely enlarged. For example, a finder shown in the third embodiment of this publication is such that, in view of only the ocular optical system, its length is more than 27 mm. Hence, when an attempt is made to mount this finder in a small-sized camera, a camera design is considerably restricted, which is unfavorable.

SUMMARY OF THE INVENTION

It is, therefore, an object of the present invention to provide a real image mode variable magnification finder which has a large angle of emergence and high magnification and is small in size and high in performance.

In order to achieve this object, the real image mode variable magnification finder according to the present invention comprises, in order from the object side, an objective optical system with positive power, including at least three lens units; an image erecting means; and an ocular optical system with positive power. This finder also satisfies the following condition:

$$0.1 \geq \beta_W Z/D_W \geq 0.080 \qquad (1)$$

where $\beta_W$ is a magnification at the wide-angle position of the finder, Z is a variable magnification ratio of the finder, and $D_W$ is an axial distance, in millimeters, from an object-side surface of a first lens unit of the objective optical system to a pupil-side surface of a third lens unit thereof at the wide-angle position of the finder.

Further, the real image mode variable magnification finder of the present invention comprises, in order from the object side, an objective optical system with positive power, including at least three lens units; an image erecting means; and an ocular optical system with positive power. This finder also satisfies the following conditions:

$$0.1 \geq \beta_W Z/D_W \geq 0.071 \quad (2)$$

$$14.5° \geq \omega' \geq 11.9° \quad (3)$$

where $\omega'$ is a half angle of view of emergence at the maximum angle of view of the finder.

Still further, the real image mode variable magnification finder of the present invention comprises, in order from the object side, an objective optical system with positive power, including at least three lens units; an image erecting means; and an ocular optical system with positive power. This finder also satisfies Condition (2) and the following condition:

$$2.5 \geq L/f_W \geq 1.72 \quad (4)$$

where L is a distance from a pupil-side surface of the third lens unit of the objective optical system to an intermediate imaging position at the wide-angle position of the finder and $f_W$ is the focal length of the objective optical system at the wide-angle position of the finder.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 18A, 18B, and 18C are sectional views showing arrangements, developed along the optical axis, at wide-angle, middle, and telephoto positions, respectively, of the real image mode variable magnification finder of a thirteenth embodiment in the present invention;

DETAILED DESCRIPTION OF THE PREFERRED EMBODIMENTS

Figure 1A:
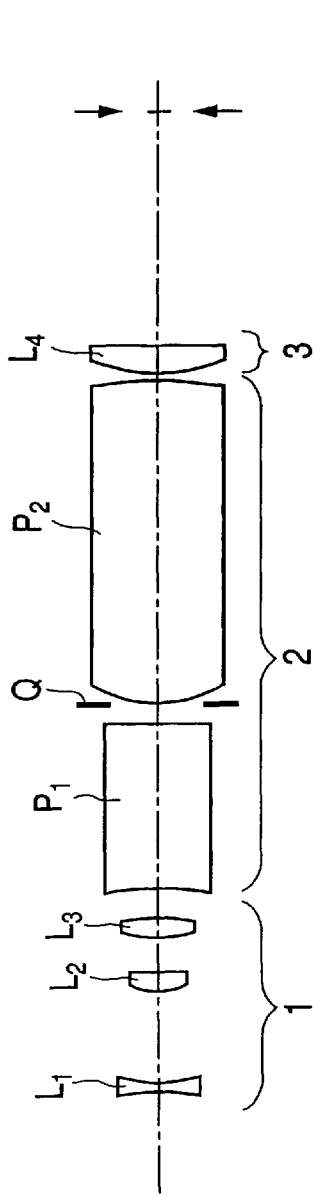
FIGS. 1A, 1B, and 1C are sectional views showing arrangements, developed along the optical axis, at wide-angle, middle, and telephoto positions, respectively, of the real image mode variable magnification finder of a first embodiment in the present invention.

As mentioned above, the real image mode variable magnification finder of the present invention includes, in order from the object side, an objective optical system with positive power, composed of at least three lens units; an image erecting means; and an ocular optical system with positive power. The finder is designed to satisfy Condition (1).

Here, Condition (1) gives a condition for favorably maintaining the balance of three requirements of satisfactory optical performance, magnification for ensuring a desirable variable magnification ratio, and the size of the objective optical system, in view of the realization of compactness of the finder. The axial distance $D_W$ indicates an amount for defining a region in which individual lens units actually constituting the objective optical system can be moved when the magnification is changed.

If the value of $\beta_W Z/D_W$ of Condition (1) exceeds the upper limit thereof, the region of movement of the individual lens units constituting the objective optical system becomes too narrow to obtain the magnification and for the variable magnification ratio to be ensured by the finder. Specifically, beyond the upper limit, the amount of movement of each lens unit of the objective optical system is insufficient, and thus the power of each lens unit becomes too strong to ensure favorable optical performance.

On the other hand, if the value of $\beta_W Z/D_W$ is below the lower limit and an attempt is made to obtain a proper finder magnification, the finder will be to large, which is unfavorable.

The real image mode variable magnification finder of the present invention includes, in order from the object side, an objective optical system with positive power, composed of at least three lens units; an image erecting means; and an ocular optical system with positive power. The finder is also designed to satisfy Conditions (2) and (3).

Condition (3) defines the size of the angle of emergence advantageous for enabling a user to have a feeling of seeing a wide image plane. If the value of the half angle of view $\omega'$ of Condition (3) is below the lower limit thereof, an observation image plane viewed through the finder becomes narrow and the feeling of seeing a wide image plane will be blunted, which is unfavorable. On the other hand, if the value of the half angle of view $\omega'$ oversteps the upper limit, it becomes difficult to attain complete optical performance when the finder is designed to be compact and simple.

An effect secured by satisfying Condition (2) is the same as in the case of Condition (1). However, the angle of emergence, in contrast with the magnification, greatly contributes to the ease with which the image plane of the finder is observed. Thus, if Condition (3) is ensured, a good finder field can be obtained even when the lower limit of Condition (1) is defined as in Condition (2).

The real image mode variable magnification finder of the present invention includes, in order from the object side, an objective optical system with positive power, composed of at least three lens units; an image erecting means; and an ocular optical system with positive power. The finder is also designed to satisfy Conditions (2) and (4).

Condition (4) defines the back focal distance of the objective optical system necessary for a compact design of the image erecting means in the finder. The image erecting means requires at least four reflecting surfaces. In order to simply design the image erecting means, it is convenient to use Porro prisms to simplify fabrication.

If the value of $L/f_W$ of Condition (4) is below the lower limit thereof, the back focal distance of the objective optical system becomes insufficient even though the Porro prisms are used to design the image erecting means, and at least three reflecting surfaces are required for the ocular optical system. With an image erecting means which does not use the Porro prisms, reflecting surfaces are not completely provided on the objective system side, and hence an optical path length required on the ocular system side is increased. Not only does this make a simple design of the ocular optical system impossible, but also it causes oversizing of the entire finder.

On the other hand, if the value of $L/f_W$ exceeds the upper limit, the objective optical system will be enlarged.

In this case also, the effect brought about by Condition (2) is the same as in Condition (1). However, if Condition (4) is satisfied, the image erecting means can be designed to be compact and simple, and thus a small-sized real image mode variable magnification finder can be realized even though the lower limit of Condition (1) is defined as in Condition (2).

The real image mode variable magnification finder of the present invention includes, in order from the object side, an objective optical system with positive power, an image erecting means, and an ocular optical system with positive power. In this case, it is desirable that the finder is designed to satisfy Conditions (3) and the following conditions:

$$13.5 \leq f_R \leq 17.3 \tag{5}$$

$$0.59 \geq \beta_W \leq 0.41 \tag{6}$$

where $f_R$ is the focal length of the ocular optical system in millimeters.

The real image mode variable magnification finder of the present invention is made to satisfy Conditions (3), (5), and (6) at the same time, and thereby equally supplies three requirements that the angle of emergence is large, the magnification is high, and the size is small, maintaining favorable optical performance without difficulty.

As mentioned above, Condition (3) defines the size of the angle of emergence advantageous for enabling a photographer to have a feeling of seeing a wide image plane. If the value of the half angle of view $\omega'$ of Condition (3) is below the lower limit thereof, the observation image plane viewed through the finder becomes narrow and it is difficult to obtain a sufficiently wide image plane. On the other hand, if the value of the half angle of view $\omega'$ oversteps the upper limit, the performance of the finder on the periphery of the field will be considerably deteriorated, and with the finder designed to be compact and simple, it becomes difficult to maintain complete optical performance.

Condition (5) defines the focal length of the ocular optical system required to achieve compactness of the finder. In order to satisfy Condition (5), it appears convenient at first sight to enlarge the finder itself because the finder design is facilitated and the influence of a fabrication error on finder performance is lessened. Such a finder, however, has a great disadvantage of causing oversizing of the camera itself. In general, when a desired angle of emergence is set, an intermediate image height, namely the size of a field mask in the real image mode finder, tends to become great in proportion to an increase of the focal length of the ocular optical system. The focal length of the ocular optical system becomes a direct value providing a necessary optical path length where the lens arrangement of the ocular optical system is simple as in an ordinary finder. It is, of course, important for compactness of the finder to keep each of the intermediate image height and the optical path length to a minimum.

If the value of the focal length $f_R$ of Condition (5) exceeds the upper limit thereof, the finder becomes large-sized, eventually causing oversizing of the camera itself. If the value of the focal length $f_R$ is below the lower limit, a high magnification of the finder can be obtained, but it becomes difficult to secure the optical performance of the objective optical system accordingly.

Condition (6) defines the magnification of the finder. The magnification of the finder at the wide-angle position is second in importance only to the angle of emergence. In general, a photographic area is often recognized in the case where it can be viewed in the widest possible range. In this case, the photographer, after observing the finder field at the wide-angle position, judges whether the finder is brought to the telephoto position and determines the composition of a picture. In an ordinary compact zoom camera, immediately after the power source is turned on or when it is off, the finder is set at the wide-angle position. As such, when a snapshot is needed or a finder observation is made without turning on the power source because of power saving, the finder field must be observed at the wide-angle position. For such various reasons, the finder observation is often carried out at the wide-angle position.

Thus, in order to take a good picture in such a case, Condition (6) is provided by the present invention. If the value of the magnification $\beta_W$ of Condition (6) is below the lower limit thereof, it becomes difficult to confirm the object image at the wide-angle position, which constitutes an obstacle to photography. Beyond the upper limit, the focal length of the objective optical system is increased, and when an attempt is made to ensure a proper variable magnification ratio, the entire finder becomes bulky.

Thus, In the present invention, a finder is designed to satisfy the above conditions, and thereby the finder which equally supplies three requirements of a small size, a simple arrangement, and a large angle of emergence can be provided. Moreover, the finder satisfying the conditions is capable of ensuring a favorable field.

For the finder of the present invention, in order to achieve a small size, a high magnification, and a large angle of emergence with a simple arrangement and easily ensure excellent optical performance, it is desirable to satisfy the above conditions and the following requirements as well.

First, in the real image mode variable magnification finder of the present invention, it is desirable that the objective optical system includes, in order from the object side, a first lens unit with negative power, a second lens unit with positive power, and a third lens unit with positive power, and each of these lens units is constructed with a single lens.

When the objective optical system of the finder is constructed as in the foregoing, the lens unit with negative power is placed at the head of the arrangement, and thus it becomes easy to ensure the back focal length of the objective optical system. Furthermore, when two positive lens units are moved along the optical axis to thereby change the magnification, a high variable magnification ratio can be easily obtained. The use of the single lens for each lens unit brings about a simple arrangement and causes cost to be reduced.

In the real mode variable magnification finder of the present invention, when an axial distance from an object-side surface of the first lens unit of the objective optical system at the wide-angle position to the position of an entrance pupil is represented by $E_{nW}$, it is desirable to satisfy the following condition:

$$0.19 < E_{nW}/D_W < 0.43 \qquad (7)$$

The real image mode variable magnification finder of the present invention is capable of achieving further compactness by satisfying Condition (7). If the value of $E_{nW}/D_W$ of Condition (7) exceeds the upper limit thereof, the entrance pupil will be located on the pupil side of the first lens unit of the objective optical system, at a considerable distance away from the first lens unit. Consequently, the lens diameter of the first lens unit is enlarged to obstruct compactness of the finder. Below the lower limit, the entrance pupil is situated on the object side of the first lens unit of the objective optical system. This is advantageous for compactness. However, the powers of the first and second lens units constituting the objective optical system become extremely strong, and for the finder having a large angle of emergence as in the present invention, it is difficult to ensure optical performance and notably to correct coma.

Furthermore, it is desirable that the finder of the present invention has a prism whose entrance surface is provided with a power and is aspherical.

In this way, the entrance surface of the prism placed in the finder is configured to be aspherical, and thereby correction for aberration is facilitated. Since the entrance surface of the prism is a place where a marginal beam of light is farthest from an axial beam of light, the fact that the entrance surface of the prism is aspherical produces a considerable effect on correction for astigmatism and coma.

In the finder of the present invention, it is favorable that the objective optical system includes, in order from the object side, a first lens unit with negative power, a second lens unit with positive power, and a third lens unit with negative power, and each of these lens units is constructed with a single lens.

When the objective optical system is constructed as mentioned above, the lens unit with negative power is placed at the head of the arrangement, and thus it becomes easy to ensure the back focal length of the objective optical system. In addition, since the third lens unit of the objective optical system has the negative power, the back focal distance can be easily adjusted, and compactness is facilitated. The use of the single lens for each lens unit brings about a simple arrangement and reduces cost to be.

In the real image mode variable magnification finder of the present invention, when the radius of curvature of the object-side surface of the second lens unit of the objective optical system is denoted by $r_3$ and the radius of curvature of the pupil-side surface thereof is denoted by $r_4$, it is desirable to satisfy the following condition:

$$-0.3 < (r_4 + r_3)/(r_4 - r_3) < 0.3 \qquad (8)$$

Condition (8) defines the configuration of the second lens unit of the objective optical system in which the positive power is concentrated. If the value of $(r_4+r_3)/(r_4-r_3)$ of Condition (8) is below the lower limit, it becomes difficult to correct aberrations, notably spherical aberration, at the telephoto position. Beyond the upper limit, it becomes difficult to equally correct spherical aberration and coma, ranging from the wide-angle position to the telephoto position.

In the real image mode variable magnification finder of the present invention, it is favorable that an aspherical surface is used for the pupil-side surface of the third lens unit of the objective optical system. Consequently, correction for aberration is further facilitated. This aspherical surface, which is a place where a separation between the axial beam and the marginal beam is maximized, has a considerable effect on correction for astigmatism and coma.

The ocular optical system of the real image mode variable magnification finder in the present invention is constructed with a single positive lens. In general, when a plurality of lenses are used for the ocular optical system, its thickness along the optical axis is increased, which is inconvenient for compactness. Moreover, since the number of parts is increased, cost becomes high and a simple arrangement ceases to be attainable.

The real image mode variable magnification finder of the present invention is designed so that the second and third lens units of the objective optical system can be moved when the magnification is changed. In the case where the objective optical system includes the lens units with negative, positive, and positive powers, its arrangement is of a retrofocus type, and thus it is relatively easy to ensure the back focal distance, which is advantageous for the construction of the image erecting optical system. However, this objective optical system, in contrast with that including the lens units with negative, positive, and negative powers, is generally difficult to ensure the back focal distance. In the objective optical system including the lens units with negative, positive, and positive powers, if the third lens unit is fixed when the magnification is changed, it becomes difficult to maintain the performance of the finder while increasing the back focal distance for the construction of the image erecting optical system. This is because lens components having the positive powers in the objective optical system must be moved toward the object side as a zoom ratio is increased. If the third lens unit is fixed, it will not be moved toward the object side, and hence a strain caused by this is imposed on the first and second lens units. In this case, the objective optical system constructed with three lenses of negative, positive, and positive powers merely have the same function for correction for aberration as in that constructed with two lenses of negative and positive powers. This becomes disadvantageous as the magnification is increased.

In accordance with the embodiments shown in the drawings, the present invention will be described in detail below.

First Embodiment

Figure 1B:
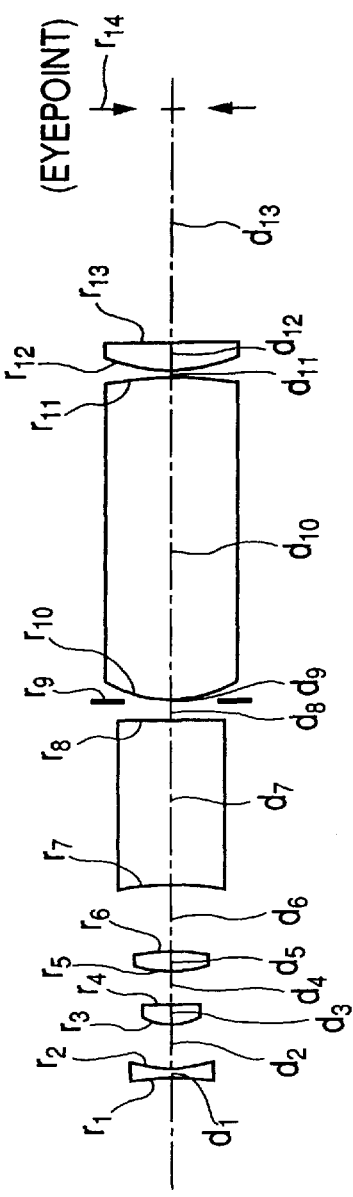
Figure 1C:
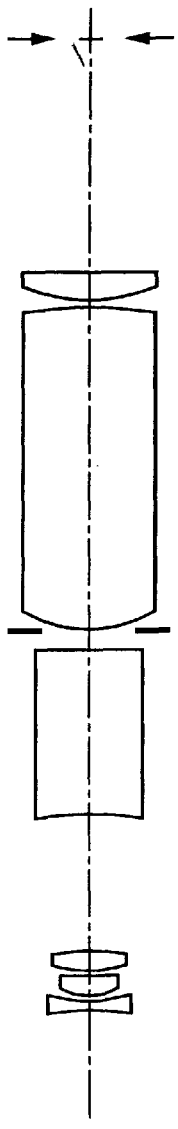
Figure 2A:
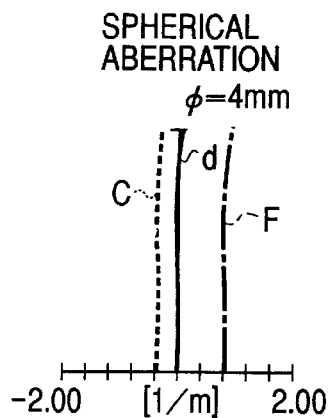
FIGS. 2A, 2B, and 2C are diagrams showing aberration characteristics at the wide-angle position of the real image mode variable magnification finder of the first embodiment.
Figure 2B:
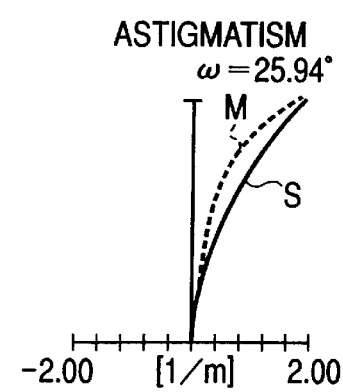
Figure 2C:
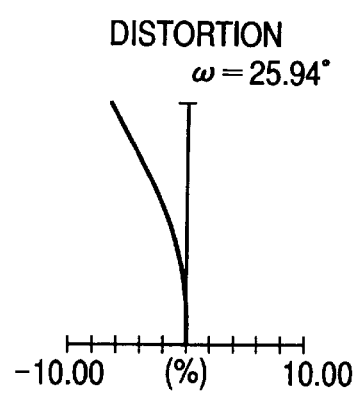
Figure 3A:
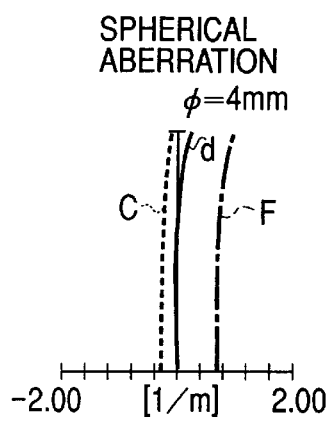
FIGS. 3A, 3B, and 3C are diagrams showing aberration characteristics at the middle position of the real image mode variable magnification finder of the first embodiment.
Figure 3B:
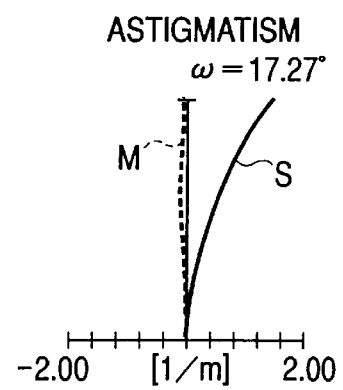
Figure 3C:
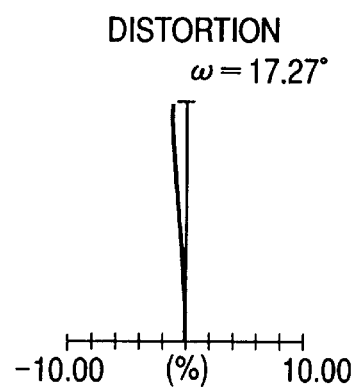
Figure 4A:
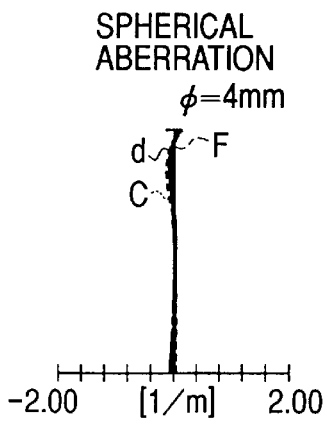
FIGS. 4A, 4B, and 4C are diagrams showing aberration characteristics at the telephoto position of the real image mode variable magnification finder of the first embodiment.
Figure 4B:
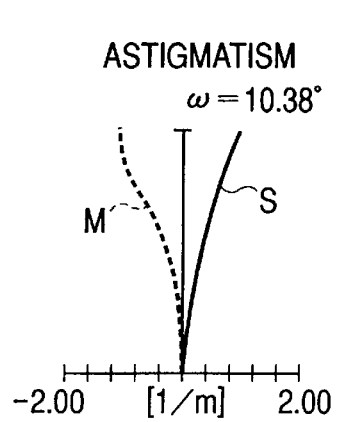
Figure 4C:
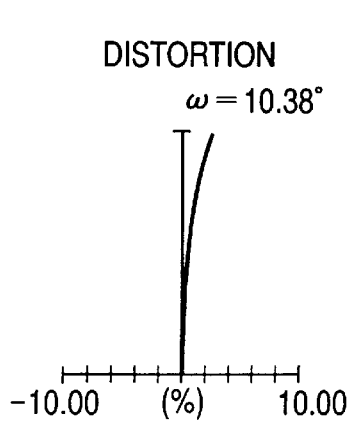

The real image mode variable magnification finder of this embodiment, as shown in FIGS. 1A, 1B, and 1C, includes, in order from the object side, an objective optical system 1 composed of a first lens unit $L_1$ with negative power, a second lens unit $L_2$ with positive power, and a third lens unit $L_3$ with positive power; an image erecting means 2 composed of prisms $P_1$ and $P_2$; and an ocular optical system 3 of an eyepiece $L_4$. Reference symbol Q represents an intermediate imaging position. Each of the first, second, and third lens units $L_1$, $L_2$, and $L_3$ is constructed with a single lens. The power is imparted to the exit surface of the prism $P_2$, and thereby favorable optical performance is obtained.

In the finder of the first embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second and third lens units $L_2$ and $L_3$ are simply moved along the optical axis toward the object side.

The following are various numerical data relative to the real image mode variable magnification finder of the first embodiment.

| | |
|---|---|
| Finder magnification | 0.50x–0.72x–1.16x |
| Variable magnification Ratio | 2.32 |
| Angle of incidence ω | 25.9°–17.2°–10.4° |
| Pupil diameter φ | 4 mm |

$f_W$=8.418

$\beta_W Z/D_W$=0.0875

ω'=12.56

$f_R$=17.120

$\beta_W$=0.495

$L/f_W$=1.997

$E_{nW}/D_W$=0.349

$r_1$=−18.8205
  $d_1$=0.6899 $n_1$=1.58423 $v_1$=30.49
$r_2$=9.4173 (aspherical)
  $d_2$=7.0084 (wide-angle), 3.4513 (middle), 0.5930 (telephoto)
$r_3$=6.6699 (aspherical)
  $d_3$=1.4620 $n_3$=1.49241 $v_3$=57.66
$r_4$=−207.5777
  $d_4$=2.7327 (wide-angle), 2.6183 (middle), 0.4096 (telephoto)
$r_5$=17.1112
  $d_5$=1.3902 $n_5$=1.49241 $v_5$=57.66
$r_6$=−15.2351 (aspherical)
  $d_6$=2.3111 (wide-angle), 5.2119 (middle), 10.6619 (telephoto)
$r_7$=−88.8526 (aspherical)
  $d_7$=13.0000 $n_7$=1.52542 $v_7$=55.78
$r_8$=∞
  $d_8$=1.5000
$r_9$=∞ (intermediate imaging position)
  $d_9$=0
$r_{10}$=10.8868
  $d_{10}$=25.2274 $n_{10}$=1.52542 $v_{10}$=55.78
$r_{11}$=−38.8640
  $d_{11}$=0.4941
$r_{12}$=12.1507 (aspherical)
  $d_{12}$=2.2191 $n_{12}$=1.52542 $v_{12}$=55.78
$r_{13}$=−247.1416
  $d_{13}$=17.9858
$r_{14}$ (eyepoint)

Conic Constants and Aspherical Coefficients

Second Surface
  K=−15.4716
  $A_4$=1.7455×10$^{-3}$, $A_6$=−8.9384×10$^{-5}$,
  $A_8$=1.7246×10$^{-6}$, $A_{10}$=2.0640×10$^{-8}$
Third Surface
  K=1.2550
  $A_4$=−1.3027×10$^{-3}$, $A_6$=3.2968×10$^{-6}$,
  $A_8$=5.7900×10$^{-7}$, $A_{10}$=−3.1956×10$^{-7}$
Sixth Surface
  K=−5.9056
  $A_4$=2.5250×10$^{-4}$, $A_6$=−5.0268×10$^{-5}$,
  $A_8$=1.4316×10$^{-5}$, $A_{10}$=−1.1585×10$^{-6}$
Seventh Surface
  K=21.7352
  $A_4$=−9.2814×10$^{-5}$, $A_6$=−2.4784×10$^{-5}$,
  $A_8$=2.0821×10$^{-6}$, $A_{10}$=−2.0337×10$^{-7}$
Twelfth Surface
  K=0.9974
  $A_4$=−1.7323×10$^{-4}$, $A_6$=−9.1203×10$^{-7}$,
  $A_8$=1.8063×10$^{-8}$, $A_{10}$=−7.3221×10$^{-10}$ FIGS. 2A–2C, 3A–3C, and 4A–4C show aberration curves in the real image mode variable magnification finder of the first embodiment.

Second Embodiment

Figure 5A:
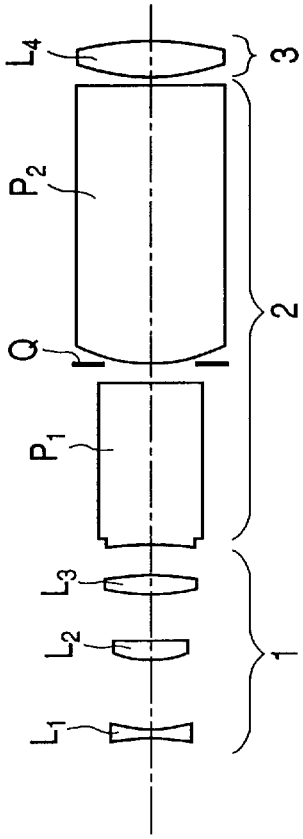
FIGS. 5A, 5B, and 5C are sectional views showing arrangements, developed along the optical axis, at wide-angle, middle, and telephoto positions, respectively, of the real image mode variable magnification finder of a second embodiment in the present invention.
Figure 5B:
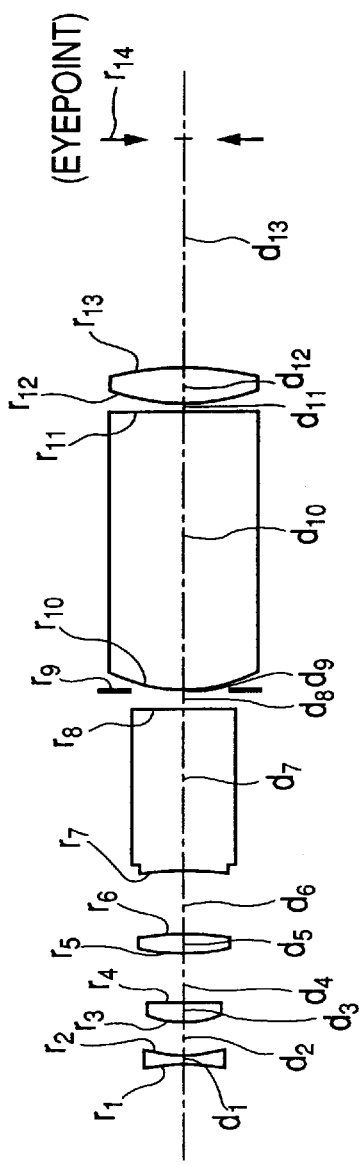
Figure 5C:
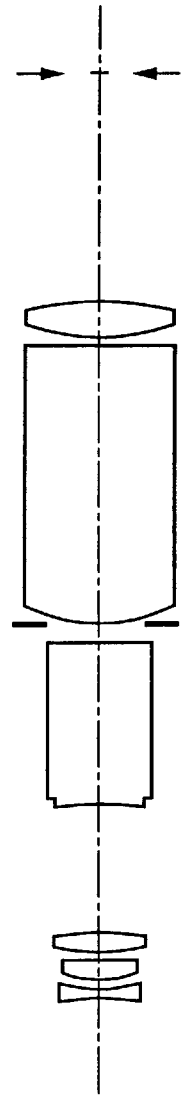

The real image mode variable magnification finder of this embodiment, as shown in FIGS. 5A, 5B, and 5C, is designed so that the exit surface of the prism $P_2$ is made powerless, and thereby correction for diopter in the ocular optical system 3 is facilitated. In the finder of the second embodiment, when the magnification is changed in the range from the wide-angle position to the telephoto position, the first lens unit $L_1$ is fixed and the second and third lens units $L_2$ and $L_3$ are simply moved along the optical axis toward the object side. With the exception of this construction, the second embodiment has the same arrangement as the first embodiment.

The following are various numerical data relative to the real image mode variable magnification finder of the second embodiment.

| Finder magnification | 0.54x–0.76x–1.23x |
|---|---|
| Variable magnification Ratio | 2.28 |
| Angle of incidence ω | 25.9°–17.2°–10.4° |
| Pupil diameter φ | 4 mm |

$f_W = 8.569$ $\beta_W Z/D_W = 0.0935$ $\omega' = 13.47$ $f_R = 16.085$ $\beta_W = 0.536$ $L/f_W = 1.952$ $E_{nW/DW} = 0.268$ $r_1 = -11.9430$
 $d_1 = 0.6788$  $n_1 = 1.58423$  $v_1 = 30.49$
$r_2 = 7.9898$ (aspherical)
 $d_2 = 5.5728$ (wide-angle), 2.8171 (middle), 0.6097 (telephoto)
$r_3 = 7.0023$ (aspherical)
 $d_3 = 1.9363$  $n_3 = 1.49241$  $v_3 = 57.66$
$r_4 = -26.3204$
 $d_4 = 3.2519$ (wide-angle), 3.3726 (middle), 0.6877 (telephoto)
$r_5 = 11.0355$
 $d_5 = 1.7332$  $n_5 = 1.49241$ 5 $v_5 = 57.66$
$r_6 = -14.7799$ (aspherical)
 $d_6 = 2.2270$ (wide-angle), 4.8620 (middle), 9.7544 (telephoto)
$r_7 = -17.8110$ (aspherical)
 $d_7 = 13.0000$  $n_7 = 1.52542$  $v_7 = 55.78$
$r_8 = \infty$
 $d_8 = 1.5000$
$r_9 = \infty$ (intermediate imaging position)
 $d_9 = 0$
$r_{10} = 12.6940$
 $d_{10} = 22.3073$  $n_{10} = 1.52542$  $v_{10} = 55.78$
$r_{11} = \infty$
 $d_{11} = 0.5000$
$r_{12} = 13.9470$ (aspherical)
 $d_{12} = 2.9864$  $n_{12} = 1.52542$  $v_{12} = 55.78$
$r_{13} = -19.8673$
 $d_{13} = 17.9203$
$r_{14}$ (eyepoint)

Figure 6A:
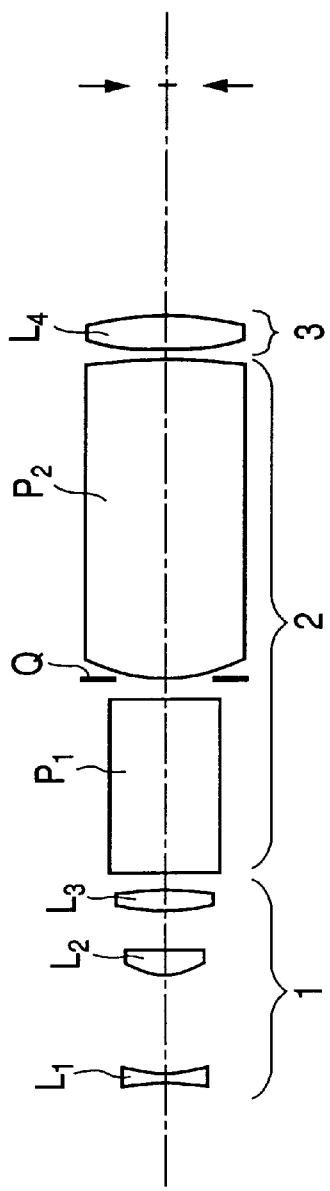
FIGS. 6A, 6B, and 6C are sectional views showing arrangements, developed along the optical axis, at wide-angle, middle, and telephoto positions, respectively, of the real image mode variable magnification finder of a third embodiment in the present invention.
Figure 6B:
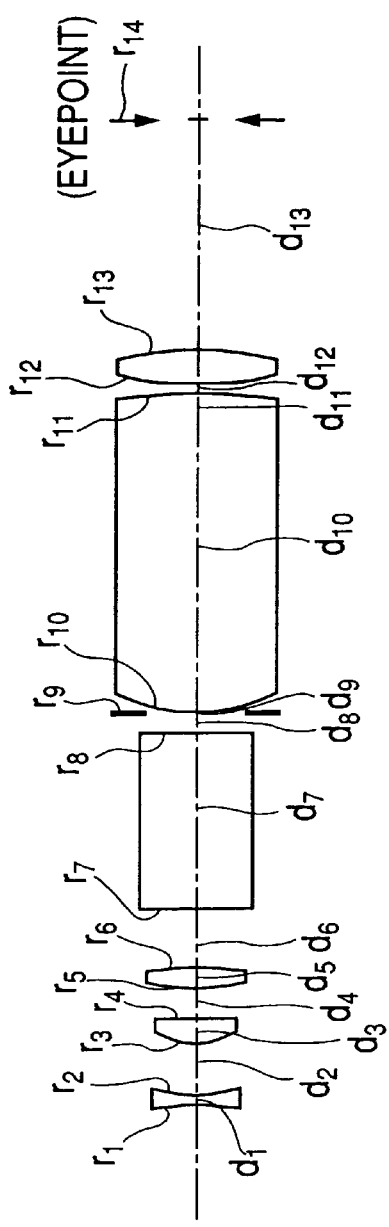
Figure 6C:
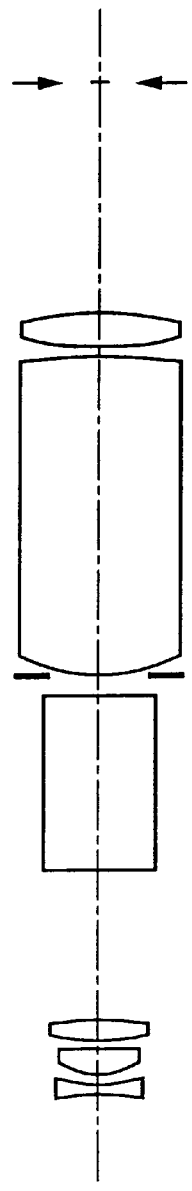

Conic Constants and Aspherical Coefficients
Second Surface
 $K = -8.2005$
 $A_4 = 1.4709 \times 10^{-3}$, $A_6 = -6.4010 \times 10^{-5}$,
 $A_8 = -1.4982 \times 10^{-6}$, $A_{10} = 2.3589 \times 10^{-7}$
Third Surface
 $K = 0.8422$
 $A_4 = -9.5843 \times 10^{-4}$, $A_6 = 1.9336 \times 10^{-5}$,
 $A_8 = -7.4622 \times 10^{-6}$, $A_{10} = 4.2967 \times 10^{-7}$
Sixth Surface
 $K = -5.9330$
 $A_4 = 1.6247 \times 10^{-4}$, $A_6 = 4.8657 \times 10^{-6}$,
 $A_8 = -7.2456 \times 10^{-7}$, $A_{10} = 5.3749 \times 10^{-8}$
Seventh Surface
 $K = 22.2054$
 $A_4 = 1.9462 \times 10^{-6}$, $A_6 = 4.3832 \times 10^{-5}$,
 $A_8 = -7.2081 \times 10^{-6}$, $A_{10} = 5.7698 \times 10^{-7}$
Twelfth Surface
 $K = 1.0359$
 $A_4 = -2.1363 \times 10^{-4}$, $A_6 = 5.2949 \times 10^{-7}$,
 $A_8 = -1.7094 \times 10^{-8}$, $A_{10} = 3.2416 \times 10^{-11}$ Third Embodiment The real image mode variable magnification finder of this embodiment, as shown in FIGS. 6A, 6B, and 6C, is designed so that the power of the third lens unit $L_3$ of the objective optical system 1 is set to be relatively weak. Consequently, even where the third lens unit $L_3$ is constructed by a framework which tends to produce a serious fabrication error, it can be fabricated with a high degree of accuracy.

In the finder of the third embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second and third lens units $L_2$ and $L_3$ are simply moved along the optical axis toward the object side. With the exception of this construction, the third embodiment has the same arrangement as the first embodiment.

The following are various numerical data relative to the real image mode variable magnification finder of the third embodiment.

| Finder magnification | 0.52x–0.74x–1.20x |
|---|---|
| Variable magnification Ratio | 2.31 |
| Angle of incidence ω | 25.9°–17.2°–10.4° |
| Pupil diameter φ | 4 mm |

$f_W = 8.507$ $\beta_W Z/D_W = 0.0851$ $\omega' = 13.06$ $f_R = 16.609$ $\beta_W = 0.516$ $L/f_W = 1.865$ $E_{nW/Dw} = 0.302$ $r_1 = -13.9667$
 $d_1 = 0.7628$  $n_1 = 1.58423$  $v_1 = 30.49$
$r_2 = 11.5854$ (aspherical)
 $d_2 = 7.0859$ (wide-angle), 3.6866 (middle), 0.7553 (telephoto)
$r_3 = 6.4361$ (aspherical)
 $d_3 = 2.1146$  $n_3 = 1.49241$  $v_3 = 57.66$ $r_4 = -19.1554$
 $d_4 = 2.7979$ (wide-angle), 2.2037 (middle), 0.4436 (telephoto)
$r_5 = 52.5849$
 $d_5 = 1.3055$ $n_5 = 1.49241$ $v_5 = 57.66$
$r_6 = -24.0143$ (aspherical)
 $d_6 = 1.3663$ (wide-angle), 4.6677 (middle), 11.2316 (telephoto)
$r_7 = -1713.5413$ (aspherical)
 $d_7 = 13.0000$ $n_7 = 1.52542$ $v_7 = 55.78$
$r_8 = \infty$
 $d_8 = 1.5000$
$r_9 = \infty$ (intermediate imaging position)
 $d_9 = 0$
$r_{10} = 11.1869$
 $d_{10} = 23.9013$ $n_{10} = 1.52542$ $v_{10} = 55.78$
$r_{11} = -38.8640$
 $d_{11} = 0.5000$
$r_{12} = 16.3063$ (aspherical)
 $d_{12} = 2.3477$ $n_{12} = 1.52542$ $v_{12} = 55.78$
$r_{13} = -33.0280$
 $d_{13} = 16.9401$
$r_{14}$ (eyepoint)

Figure 7A:
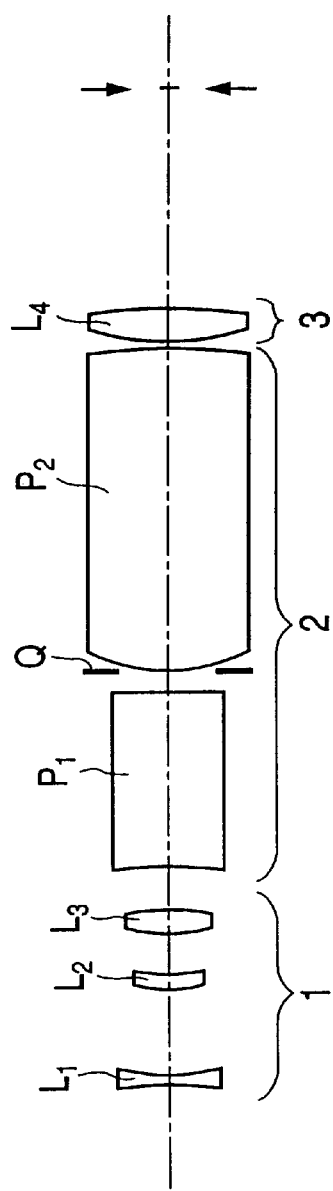
FIGS. 7A, 7B, and 7C are sectional views showing arrangements, developed along the optical axis, at wide-angle, middle, and telephoto positions, respectively, of the real image mode variable magnification finder of a fourth embodiment in the present invention.
Figure 7B:
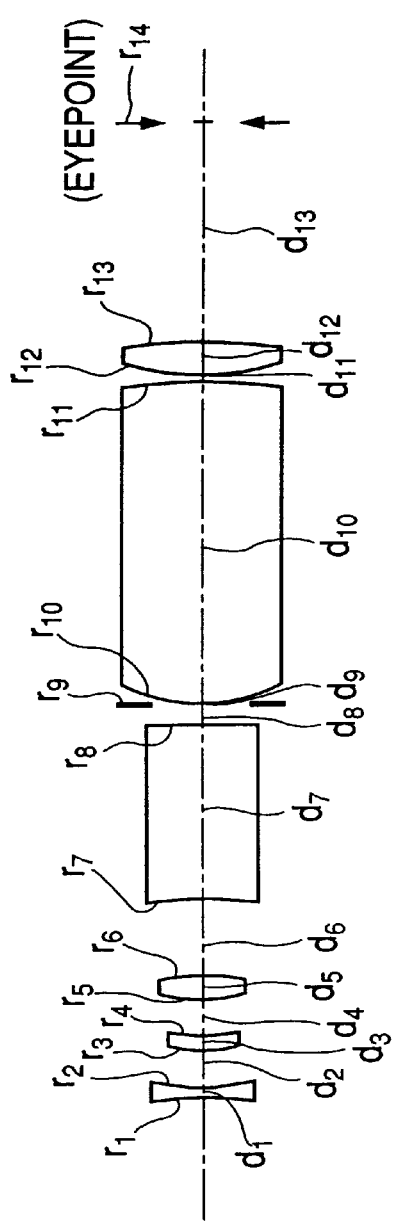
Figure 7C:
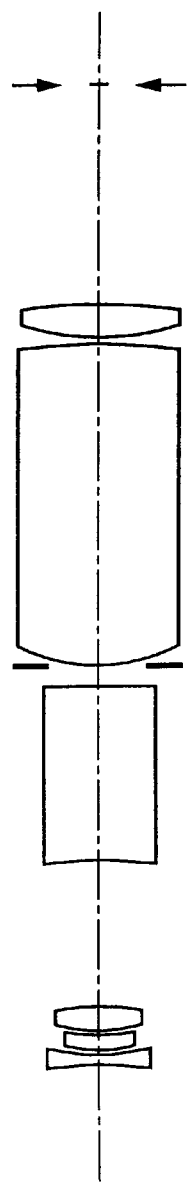

Conic Constants and Aspherical Coefficients
Second Surface
 $K = -13.7398$
 $A_4 = 4.0147 \times 10^{-4}$, $A_6 = -2.3336 \times 10^{-6}$,
 $A_8 = -4.9421 \times 10^{-7}$, $A_{10} = 2.0929 \times 10^{-8}$
Third Surface
 $K = 1.1401$
 $A_4 = -1.4209 \times 10^{-3}$, $A_6 = 1.1084 \times 10^{-5}$,
 $A_8 = -1.1398 \times 10^{-6}$, $A_{10} = -8.3722 \times 10^{-8}$
Sixth Surface
 $K = -5.8988$
 $A_4 = 5.2171 \times 10^{-4}$, $A_6 = -1.0596 \times 10^{-6}$,
 $A_8 = 3.1513 \times 10^{-6}$, $A_{10} = -1.8097 \times 10^{-7}$
Seventh Surface
 $K = 21.5130$
 $A_4 = -3.8863 \times 10^{-4}$, $A_6 = 7.0908 \times 10^{-5}$,
 $A_8 = -6.4180 \times 10^{-6}$, $A_{10} = 1.7185 \times 10^{-7}$
Twelfth Surface
 $K = 0.9802$
 $A_4 = -1.6072 \times 10^{-4}$, $A_6 = 1.4601 \times 10^{-6}$,
 $A_8 = -1.2801 \times 10^{-8}$, $A_{10} = -1.7480 \times 10^{-10}$ Fourth Embodiment The real image mode variable magnification finder of this embodiment, as shown in FIGS. 7A, 7B, and 7C, is such that the power of the second lens unit $L_2$ of the objective optical system 1 is set to be relatively weak. Consequently, even where the second lens unit $L_2$ is constructed by a framework which tends to produce a serious fabrication error, it can be fabricated with a high degree of accuracy.

In the finder of the fourth embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second and third lens units $L_2$ and $L_3$ are simply moved along the optical axis toward the object side. With the exception of this construction, the fourth embodiment has the same arrangement as the first embodiment.

The following are various numerical data relative to the real image mode variable magnification finder of the fourth embodiment.

| Finder magnification | 0.51x–0.74x–1.20x |
|---|---|
| Variable magnification Ratio | 2.35 |
| Angle of incidence ω | 25.9°–17.2°–10.4° |
| Pupil diameter φ | 4 mm |

$\beta_W Z/D_W = 0.0927$ $\omega' = 13.00$ $f_R = 16.612$ $\beta_W = 0.514$ $L/f_W = 2.062$ $E_{nW/DW} = 0.370$ $r_1 = -24.4267$
 $d_1 = 0.3942$ $n_1 = 1.58423$ $v_1 = 30.49$
$r_2 = 9.6426$ (aspherical)
 $d_2 = 6.6181$ (wide-angle), 2.7485 (middle), 0.4416 (telephoto)
$r_3 = 6.6372$ (aspherical)
 $d_3 = 1.1800$ $n_3 = 1.49241$ $v_3 = 57.66$
$r_4 = 10.3044$
 $d_4 = 2.6907$ (wide-angle), 2.4771 (middle), 0.4808 (telephoto)
$r_5 = 7.4029$
 $d_5 = 2.0344$ $n_5 = 1.49241$ $v_5 = 57.66$
$r_6 = -12.6330$ (aspherical)
 $d_6 = 2.9886$ (wide-angle), 5.4594 (middle), 10.0796 (telephoto)
$r_7 = -56.6021$ (aspherical)
 $d_7 = 13.0000$ $n_7 = 1.52542$ $v_7 = 55.78$
$r_8 = \infty$
 $d_8 = 1.5000$
$r_9 = \infty$ (intermediate imaging position)
 $d_9 = 0$
$r_{10} = 10.7516$
 $d_{10} = 23.9805$ $n_{10} = 1.52542$ $v_{10} = 55.78$
$r_{11} = -38.8640$
 $d_{11} = 0.5000$
$r_{12} = 15.3539$ (aspherical)
 $d_{12} = 2.3917$ $n_{12} = 1.52542$ $v_{12} = 55.78$
$r_{13} = -38.0404$
 $d_{13} = 17.1076$
$r_{14}$ (eyepoint)

Conic Constants and Aspherical Coefficients
Second Surface
 $K = -12.8863$
 $A_4 = 1.3626 \times 10^{-3}$, $A_6 = -3.0178 \times 10^{-5}$,
 $A_4 = 1.0673 \times 10^{-6}$, $A_{10} = -2.4893 \times 10^{-7}$
Third Surface
 $K = 1.1261$
 $A_4 = -9.6558 \times 10^{-4}$, $A_6 = 3.0563 \times 10^{-5}$,
 $A_8 = 1.5913 \times 10^{-7}$, $A_{10} = -3.4994 \times 10^{-7}$
Sixth Surface
 $K = -5.8989$
 $A_4 = 5.3618 \times 10^{-4}$, $A_6 = -1.6872 \times 10^{-5}$,
 $A_8 = 7.0618 \times 10^{-6}$, $A_{10} = -4.5401 \times 10^{-7}$ Seventh Surface

K=21.4591

$A_4$=−3.3823×10$^{-4}$, $A_6$=2.5756×10$^{-5}$, $A_8$=−1.3747×10$^{-6}$, $A_{10}$=−6.0115×10$^{-8}$

Twelfth Surface

K=0.9743

$A_4$=−1.6268×10$^{-4}$, $A_6$=4.7138×10$^{-7}$, $A_8$=3.1736×10$^{-8}$, $A_{10}$=−1.0414×10$^{-9}$

Fifth Embodiment

Figures 8A, 8B, 8C:
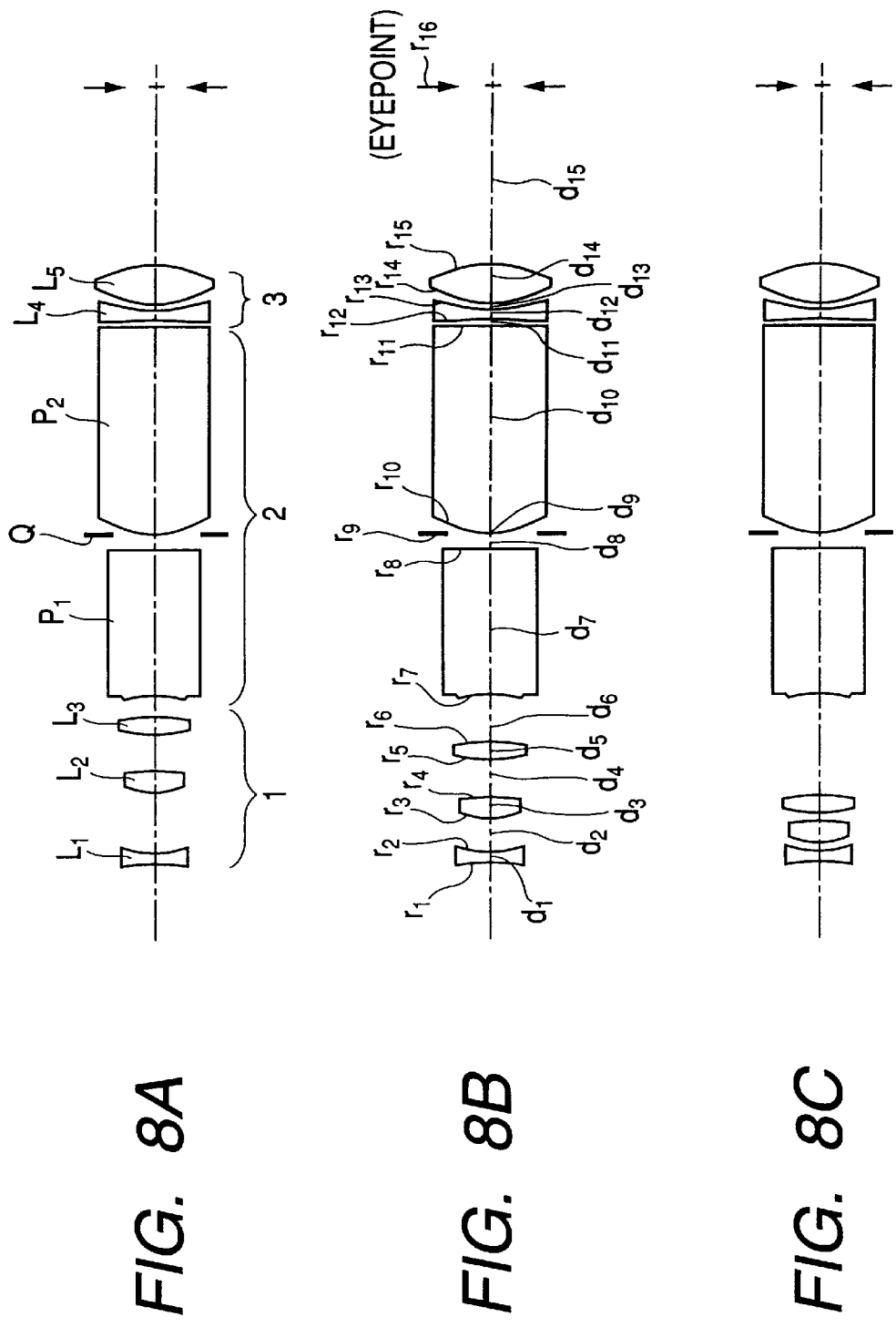
FIGS. 8A, 8B, and 8C are sectional views showing arrangements, developed along the optical axis, at wide-angle, middle, and telephoto positions, respectively, of the real image mode variable magnification finder of a fifth embodiment in the present invention.

The real image mode variable magnification finder of this embodiment, as shown in FIGS. 8A, 8B, and 8C, includes, in order from the object side, the objective optical system 1 composed of the first lens unit $L_1$ with negative power, the second lens unit $L_2$ with positive power, and the third lens unit $L_3$ with positive power; the image erecting means 2 composed of the prisms $P_1$ and $P_2$; and the ocular optical system 3 composed of eyepieces $L_4$ and $L_5$.

The real image mode variable magnification finder of the fifth embodiment uses the ocular optical system 3 constructed with two eyepieces $L_4$ and $L_5$, and thereby axial chromatic aberration can be more favorably corrected than the case where a single lens is used in the ocular optical system. In the finder of the fifth embodiment, when the magnification is changed in the range from the wide-angle position to the telephoto position, the first lens unit $L_1$ is fixed and the second and third lens units $L_2$ and $L_3$ are simply moved along the optical axis toward the object side. With the exception of this construction, the fifth embodiment has the same arrangement as the first embodiment.

The following are various numerical data relative to the real image mode variable magnification finder of the fifth embodiment.

| | |
|---|---|
| Finder magnification | 0.53x–0.76x–1.24x |
| Variable magnification Ratio | 2.34 |
| Angle of incidence ω | 25.9°–17.2°–10.4° |
| Pupil diameter φ | 4 mm |

$\beta_W Z/D_W$=0.0923

ω'=13.63

$f_R$=16.143

$\beta_W$=0.528

$L/f_W$=1.955

$E_{nW}/D_W$=0.253

$r_1$=−11.9164

$d_1$=0.8000 $n_1$=1.58423 $v_1$=30.49

$r_2$=7.2617 (aspherical)

$d_2$=5.6500 (wide-angle), 2.8686 (middle), 0.7000 (telephoto)

$r_3$=6.4909 (aspherical)

$d_3$=2.0141 $n_3$=1.49241 $v_3$=57.66

$r_4$=−24.4414

$d_4$=3.2465 (wide-angle), 3.3786 (middle), 0.7000 (telephoto)

$r_5$=9.9877

$d_5$=1.6701 $n_5$=1.49241 $v_5$=57.66

$r_6$=−17.1782 (aspherical)

$d_6$=2.0194 (wide-angle), 4.6686 (middle), 9.5159 (telephoto)

$r_7$=−14.1234 (aspherical)

$d_7$=13.0000 $n_7$=1.52542 $v_7$=55.78

$r_8$=∞

$d_8$=1.5000

$r_9$=∞ (intermediate imaging position)

$d_9$=0

$r_{10}$9.6125

$d_{10}$=18.7444 $n_{10}$=1.52542 $v_{10}$=55.78

$r_{11}$=∞

$d_{11}$=0.5474

$r_{12}$=−89.5887

$d_{12}$=0.8000 $n_{12}$=1.58423 $v_{12}$=30.49

$r_{13}$=14.2221

$d_{13}$=0.5000

$r_{14}$=8.3821 (aspherical)

$d_{14}$=3.6570 $n_{14}$=1.52542 $v_{14}$=55.78

$r_{15}$=−11.4517

$d_{15}$=15.4775

$r_{16}$ (eyepoint)

Conic constants and aspherical coefficients

Second Surface

K=−6.4247

$A_4$=1.4412×10$^{-3}$, $A_6$=−4.9728×10$^{-5}$, $A_8$=−5.6139×10$^{-6}$, $A_{10}$=3.9293×10$^{-7}$

Third Surface

K=0.7576

$A_4$=−1.0970×10$^{-3}$, $A_6$=5.1153×10$^{-5}$, $A_8$=−1.2404×10$^{-5}$, $A_{10}$=5.4899×10$^{-7}$

Sixth Surface

K=−5.9354

$A_4$=2.9215×10$^{-4}$, $A_6$=3.0498×10$^{-5}$, $A_8$=−3.2951×10$^{-6}$, $A_{10}$1.3782×10$^{-7}$

Seventh Surface

K=22.0227

$A_4$=1.2530×10$^{-4}$, $A_6$=2.8407×10$^{-4}$, $A_8$=−6.1407×10$^{-5}$, $A_{10}$=6.3753×10$^{-6}$

Fourteenth Surface

K=0.9816

$A_4$=−7.6407×10$^{-4}$, $A_6$=−7.4772×10$^{-6}$, $A_8$=2.9590×10$^{-7}$, $A_{10}$=−1.5293×10$^{-8}$

Sixth Embodiment

Figure 9A:
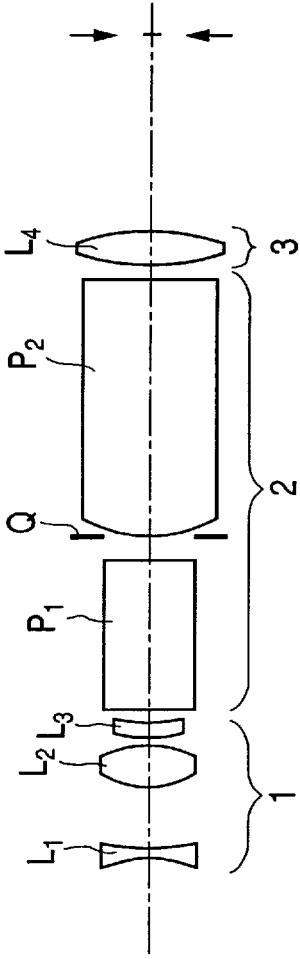
FIGS. 9A, 9B, and 9C are sectional views showing arrangements, developed along the optical axis, at wide-angle, middle, and telephoto positions, respectively, of the real image mode variable magnification finder of a sixth embodiment in the present invention.
Figure 9B:
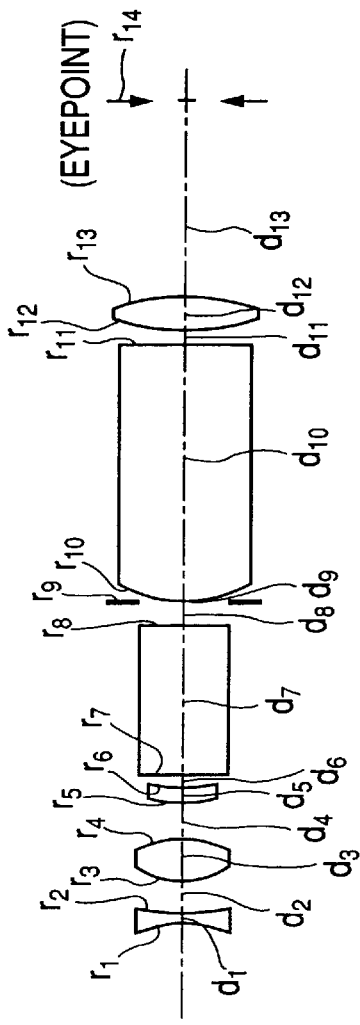
Figure 9C:
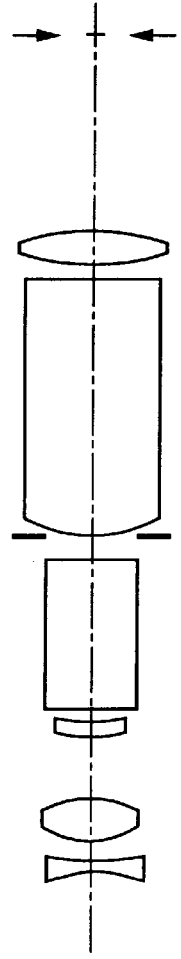

The real image mode variable magnification finder of this embodiment, as shown in FIGS. 9A, 9B, and 9C, includes, in order from the object side, the objective optical system 1 composed of the first lens unit $L_1$ with negative power, the second lens unit $L_2$ with positive power, and the third lens unit $L_3$ with negative power; the image erecting means 2 composed of the prisms $P_1$ and $P_2$; and the ocular optical system 3 of the eyepiece $L_4$. Each of the first, second, and third lens units $L_1$, $L_2$, and $L_3$ is constructed with a single lens. The power of the eyepiece $L_4$ constituting the ocular optical system 3 is made somewhat weak to thereby allow a good margin for the fabrication error.

In the finder of the sixth embodiment, when the magnification is changed in the range from the wide-angle position to the telephoto position, the first and second lens units $L_1$ and $L_2$ are simply moved along the optical axis toward the object side. The third lens unit $L_3$ remains fixed.

The following are various numerical data relative to the real image mode variable magnification finder of the sixth embodiment.

| | |
|---|---|
| Finder magnification | 0.50x–0.72x–0.90x |
| Variable magnification Ratio | 1.80 |
| Angle of incidence ω | 24.6°–16.4°–12.8° |
| Pupil diameter φ | 5 mm |

$f_W=7.854$ $\beta_W Z/D_W=0.0810$ $\omega'=12.146$ $f_R=15.615$ $\beta_W=0.503$ $L/f_W=1.929$ $E_{nW}/D_W=0.287$ $(r_4+r_3)/(r_4-r_3)=0.086$ $r_1=-7.7327$
 $d_1=1.0000$ $n_1=1.58423$ $\nu_1=30.49$
$r_2=12.9770$
 $d_2=5.0306$ (wide-angle), 2.6881 (middle), 1.5559 (telephoto)
$r_3=6.0114$ (aspherical)
 $d_3=3.3714$ $n_3=1.52542$ $\nu_3=55.78$
$r_4=-7.1354$ (aspherical)
 $d_4=0.5950$ (wide-angle), 3.0980 (middle), 5.2928 (telephoto)
$r_5=18.6067$ (aspherical)
 $d_5=1.1307$ $n_5=1.58423$ $\nu_5=30.49$
$r_6=13.2363$ (aspherical)
 $d_6=1.0195$
$r_7=\infty$
 $d_7=12.0000$ $n_7=1.52542$ $\nu_7=55.78$
$r_8=\infty$
 $d_8=2.1309$
$r_9=\infty$ (intermediate imaging position)
 $d_9=-0.1000$
$r_{10}=8.9743$
 $d_{10}=20.4021$ $n_{10}=1.52542$ $\nu_{10}=55.78$
$r_{11}=\infty$
 $d_{11}1.2184$
$r_{12}=14.0632$ (aspherical)
 $d_{12}=2.7568$ $n_{12}=1.49241$ $\nu_{12}=57.66$
$r_{13}=-15.8663$
 $d_{13}=15.9200$
$r_{14}$ (eyepoint)

Figure 10A:
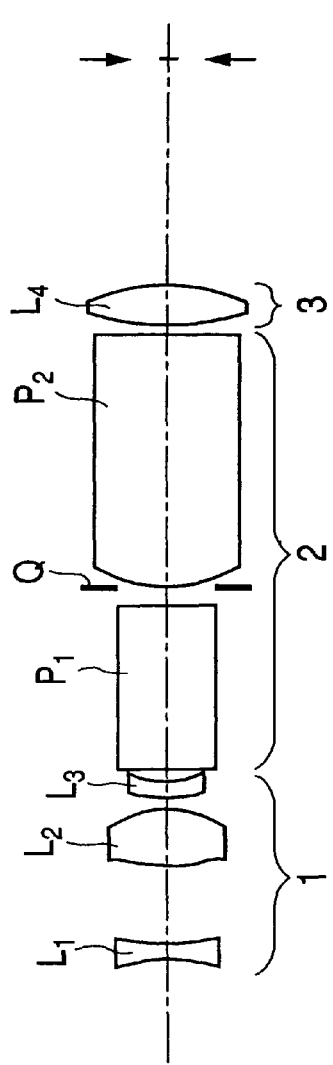
FIGS. 10A, 10B, and 10C are sectional views showing arrangements, developed along the optical axis, at wide-angle, middle, and telephoto positions, respectively, of the real image mode variable magnification finder of a seventh embodiment in the present invention.
Figure 10B:
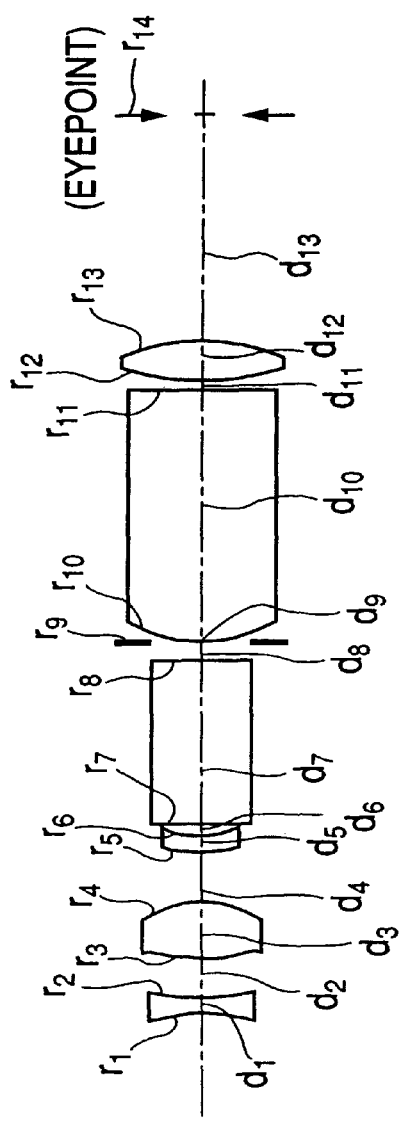
Figure 10C:
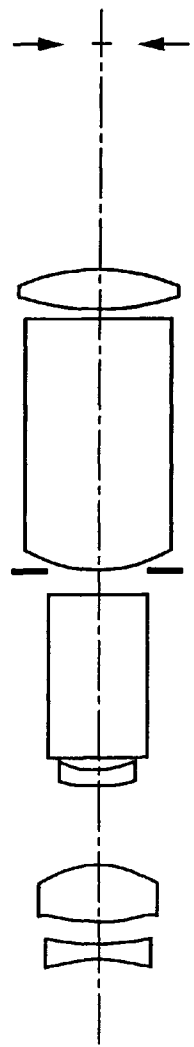

Conic Constants and Aspherical Coefficients
Third Surface
 $K=-0.0081$
 $A_4=-8.8949\times10^{-4}$, $A_6=-1.7560\times10^{-5}$,
 $A_8=8.4270\times10^{-7}$, $A_{10}=3.0843\times10^{-8}$
Fourth Surface
 $K=0.0206$
 $A_4=9.0246\times10^{-4}$, $A_6=-2.4544\times10^{-5}$,
 $A_8=1.9954\times10^{-6}$, $A_{10}=1.1109\times10^{-8}$
Fifth Surface
 $K=-0.0030$
 $A_4=-3.8983\times10^{-5}$, $A_6=-1.5155\times10^{-4}$,
 $A_8=3.1156\times10^{-5}$, $A_{10}=-1.8414\times10^{-6}$
Sixth Surface
 $K=0.1229$
 $A_4=4.0291\times10^{-4}$, $A_6=-1.8480\times10^{-4}$,
 $A_8=4.6486\times10^{-5}$, $A_{10}=-2.8042\times10^{-6}$
Twelfth Surface
 $K=-2.0399$
 $A_4=-4.3814\times10^{-5}$, $A_6=-1.2820\times10^{-6}$,
 $A_8=8.9292\times10^{-8}$, $A_{10}=-1.7535\times10^{-9}$ Seventh Embodiment The real image mode variable magnification finder of this embodiment, as shown in FIGS. 10A, 10B, and 10C, is designed so that the power of the eyepiece $L_4$ constituting the ocular optical system 3 is strengthened to obtain the angle of emergence as large as about 13.5°, although the entire length is short. In the finder of the seventh embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second lens unit $L_2$ is simply moved along the optical axis toward the object side. The third lens unit $L_3$ remains fixed. With the exception of this construction, the seventh embodiment has the same arrangement as the sixth embodiment.

Various numerical data relative to the real image mode variable magnification finder of the seventh embodiment are shown below.

| | |
|---|---|
| Finder magnification | 0.56x–0.79x–1.00x |
| Variable magnification Ratio | 1.79 |
| Angle of incidence ω | 24.6°–16.4°–12.8° |
| Pupil diameter φ | 5 mm |

$f_W=7.854$ $\beta_W Z/D_W=0.0759$ $\omega'=13.425$ $f_R=14.061$ $\beta_W=0.557$ $L/f_W=1.851$ $E_{nW}/D_W=0.286$ $(r_4+r_3)/(r_4-r_3)=-0.079$ $r_1=-8.8954$
 $d_1=1.0000$ $n_1=1.58423$ $\nu_1 30.49$
$r_2=16.1610$
 $d_2=5.8026$ (wide-angle), 2.9326 (middle), 1.5453 (telephoto)
$r_3=8.1551$ (aspherical)
 $d_3=4.2737$ $n_3=1.52542$ $\nu_3=57.78$
$r_4=-6.9596$ (aspherical)
 $d_4=0.6000$ (wide-angle), 3.3364 (middle), 5.7745 (telephoto)
$r_5=6.7865$ (aspherical)
 $d_5=1.4674$ $n_5=1.58423$ $\nu_5=30.49$
$r_6=5.8430$ (aspherical)
 $d_6=0.9200$
$r_7=\infty$ $d_7=12.0000$ $n_7=1.52542$ $v_7=55.78$
$r_8=\infty$
  $d_8=1.6179$
$r_9=\infty$ (intermediate imaging position)
  $d_9-0.1000$
$r_{10}=10.3730$
  $d_{10}=18.5000$ $n_{10}=1.52542$ $v_{10}=55.78$
$r_{11}=\infty$
  $d_{11}=0.6557$
$r_{12}=15.1310$ (aspherical)
  $d_{12}=3.0591$ $n_{12}=1.49241$ $v_{12}=57.66$
$r_{13}=-11.9141$
  $d_{13}=15.9200$
$r_{14}$ (eyepoint)

Figure 11A:
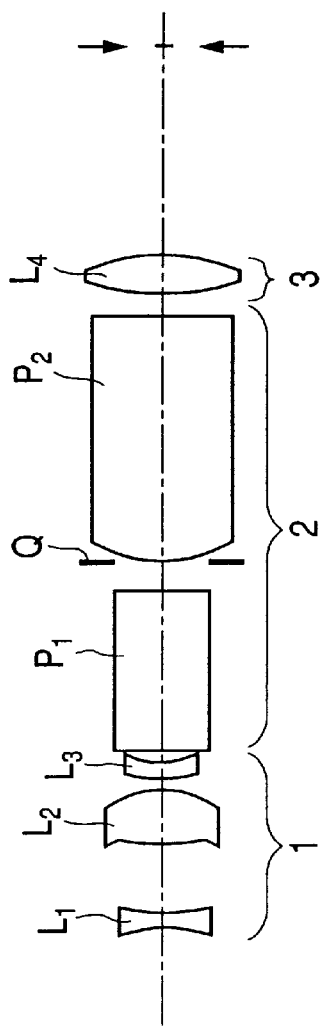
FIGS. 11A, 11B, and 11C are sectional views showing arrangements, developed along the optical axis, at wide-angle, middle, and telephoto positions, respectively, of the real image mode variable magnification finder of an eighth embodiment in the present invention.
Figure 11B:
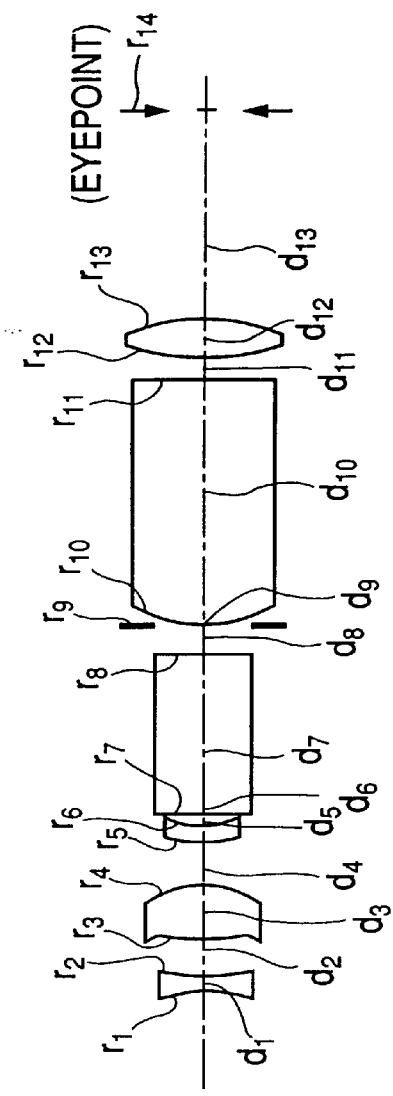
Figure 11C:
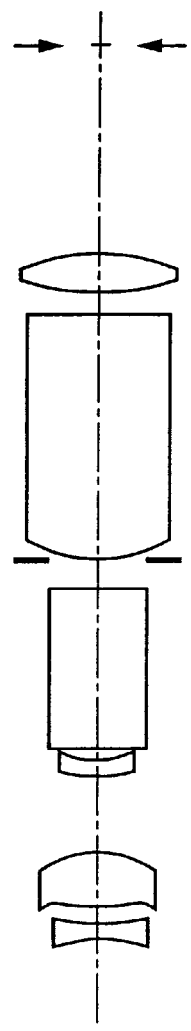

Conic Constants and Aspherical Coefficients
Third Surface
  $K=-0.0298$
  $A_4=-9.8558\times10^{-4}$, $A_6=-1.9652\times10^{-5}$,
  $A_8=1.6763\times10^{-6}$, $A_{10}=-2.2067\times10^{-7}$
Fourth Surface
  $K=0.0218$
  $A_4=2.6191\times10^{-4}$, $A_6=-1.7595\times10^{-5}$,
  $A_8=5.3141\times10^{-7}$, $A_{10}=-7.1628\times10^{-8}$
Fifth Surface
  $K=-0.0137$
  $A_4=3.1514\times10^{-5}$, $A_6=5.4653\times10^{-6}$,
  $A_8=9.4575\times10^{-6}$, $A_{10}=-1.6600\times10^{-6}$
Sixth Surface
  $K=0.1181$
  $A_4=2.8536\times10^{-5}$, $A_6=5.0435\times10^{-5}$,
  $A_8=2.3440\times10^{-5}$, $A_{10}=-4.4028\times10^{-6}$
Twelfth Surface
  $K=-2.0058$
  $A_4=-2.1032\times10^{-4}$, $A_6=4.1111\times10^{-6}$,
  $A_8=-8.3856\times10^{-8}$, $A_{10}=6.3382\times10^{-10}$ Eighth Embodiment The real image mode variable magnification finder of this embodiment, as shown in FIGS. 11A, 11B, and 11C, is designed so that the power of the object-side surface of the second lens unit $L_2$ of the objective optical system 1 is lessened. Thus, even when the pupil-side Surface of the second lens unit $L_2$ is configured to be aspherical, the decentering of the object-side Surface thereof is minimized, which is advantageous. In the finder of the eighth embodiment, when the magnification is changed in the range from the wide-angle position to the telephoto position, the first lens unit $L_1$ is moved along the optical axis toward the object side in the range from the wide-angle position to the vicinity of the middle position, and toward the pupil side in the range from the vicinity of the middle position to the telephoto position. The second lens unit $L_2$ is simply moved along the optical axis toward the object side. The third lens unit $L_3$ remains fixed. With the exception of this construction, the eighth embodiment has the same arrangement as the sixth embodiment.

Various numerical data relative to the real Image mode variable magnification finder of the eighth embodiment are shown below.

| | |
|---|---|
| Finder magnification | 0.52x–0.74x–0.93x |
| Variable magnification Ratio | 1.79 |
| Angle of incidence ω | 24.6°–16.4°–12.8° |
| Pupil diameter φ | 5 mm |

$f_W=7.851$ $\beta_W Z/D_W=0.0730$ $\omega'=12.540$ $f_R=15.062$ $\beta_W=0.520$ $L/f_W=1.903$ $E_{nW}/D_W=0.279$ $(r_4+r_3)/(r_4-r_3)=-0.283$ $r_1=-9.15054$
  $d_1=0.9255$ $n_1=1.58423$ $v_1=30.49$
$r_2=15.9413$
  $d_2=5.7256$ (wide-angle), 2.7645 (middle), 1.3323 (telephoto)
$r_3=10.4761$ (aspherical)
  $d_3=4.0350$ $n_3=1.52542$ $v_3=55.78$
$r_4=-5.8587$ (aspherical)
  $d_4=0.5915$ (wide-angle), 3.1703 (middle), 5.4803 (telephoto)
$r_5=8.3407$ (aspherical)
  $d_5=1.4749$ $n_5=1.58423$ $v_5=30.49$
$r_6=7.0769$ (aspherical)
  $d_6=0.9512$
$r_7=\infty$
  $d_7=12.0000$ $n_7=1.52542$ $v_7=55.78$
$r_8=\infty$
  $d_8=1.9886$
$r_9=\infty$ (intermediate imaging position)
  $d_9=-0.1000$
$r_{10}=9.9922$
  $d_{10}=18.9330$ $n_{10}=1.52542$ $v_{10}=55.78$
$r_{11}=\infty$
  $d_{11}=1.3841$
$r_{12}=17.3947$ (aspherical)
  $d_{12}=2.9191$ $n_{12}=1.49241$ $v_{12}=57.66$
$r_{13}=-12.2131$
  $d_{13}=15.9200$
$r_{14}$ (eyepoint)

Figure 12A:
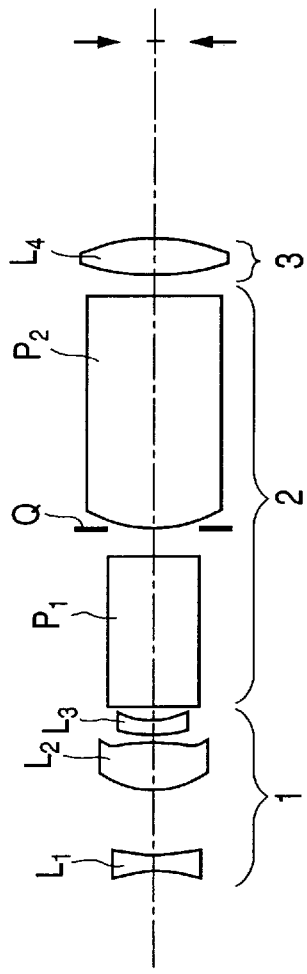
FIGS. 12A, 12B, and 12C are sectional views showing arrangements, developed along the optical axis, at wide-angle, middle, and telephoto positions, respectively, of the real image mode variable magnification finder of a ninth embodiment in the present invention.
Figure 12B:
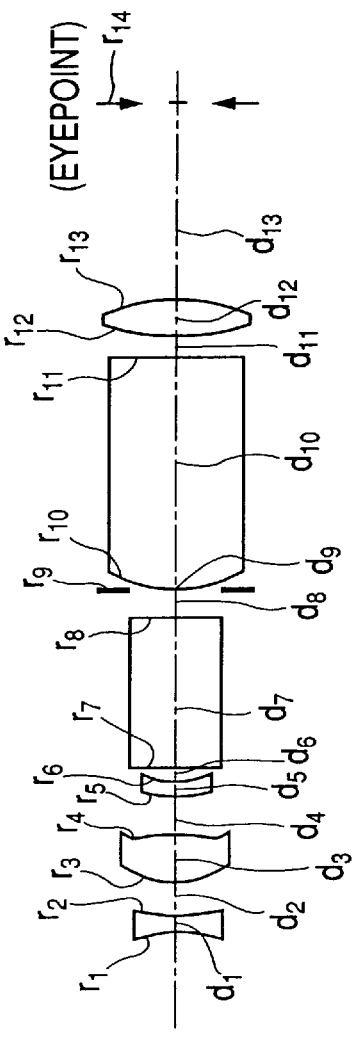
Figure 12C:
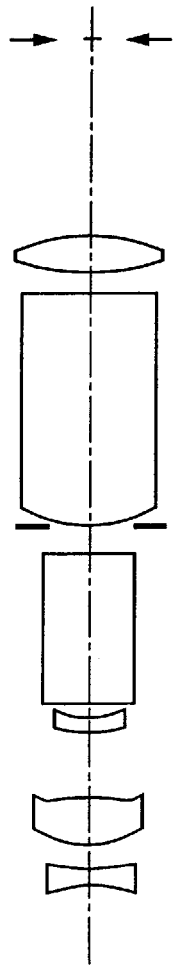

Conic Constants and Aspherical Coefficients
Third Surface
  $K=-0.0019$
  $A_4=-1.6308\times10^{-3}$, $A_6=-5.7533\times10^{-5}$,
  $A_8=4.3590\times10^{-6}$, $A_{10}=-1.0068\times10^{-6}$
Fourth Surface
  $K=0.0198$
  $A_4=-2.3932\times10^{-6}$, $A_6=-3.1963\times10^{-5}$,
  $A_8=-1.1912\times10^{-7}$, $A_{10}=-1.1871\times10^{-7}$
Fifth Surface
  $K=-0.0071$
  $A_4=3.4406\times10^{-4}$, $A_6=1.5239\times10^{-6}$,
  $A_8=5.3625\times10^{-6}$, $A_{10}=-1.3708\times10^{-6}$
Sixth Surface K=0.1238
$A_4=5.8122\times10^{-4}$, $A_6=-1.1524\times10^{-5}$,
$A_8=2.5240\times10^{-5}$, $A_{10}=-4.1229\times10^{-6}$
Twelfth Surface
K=−2.0826
$A_4=-1.8796\times10^{-4}$, $A_6=3.5615\times10^{-6}$,
$A_8=-5.2833\times10^{-8}$, $A_{10}=2.1222\times10^{-11}$ Ninth Embodiment The real image mode variable magnification finder of this embodiment, as shown in FIGS. 12A, 12B, and 12C, is designed so that the power of the pupil-side surface of the second lens unit $L_2$ of the objective optical system 1 is reduced. Thus, even when the object-side Surface of the second lens unit $L_2$ is configured to be aspherical, the decentering of the pupil-side surface thereof is minimized, which is advantageous. In the finder of the ninth embodiment, when the magnification is changed in the range from the wide-angle position to the telephoto position, the first and second lens units $L_1$ and $L_2$ are moved along the optical axis toward the object side. The third lens unit $L_3$ is fixed. With the exception of this construction, the ninth embodiment has the same arrangement as the sixth embodiment.

The following are various numerical data relative to the real image mode variable magnification finder of the ninth embodiment.

| Finder magnification | 0.52x–0.74x–0.93x |
|---|---|
| Variable magnification Ratio | 1.79 |
| Angle of incidence ω | 24.6°–16.4°–12.8° |
| Pupil diameter φ | 5 mm |

$f_W=7.856$ $\beta_W Z/D_W=0.0747$ $\omega'=12.561$ $f_R=15.130$ $\beta_W=0.520$ $L/f_W=1.860$ $E_{nW}/D_W=0.276$ $(r_4+r_3)/(r_4-r_3)=-0.271$ $r_1=-7.8788$
 $d_1=1.2858$ $n_1=1.58423$ $v_1 30.49$
$r_2=15.9412$
 $d_2=5.4629$ (wide-angle), 2.9066 (middle), 1.6723 (telephoto)
$r_3=5.4861$ (aspherical)
 $d_3=3.9369$ $n_3=1.52542$ $v_3=55.78$
$r_4=-9.5632$ (aspherical)
 $d_4=0.6000$ (wide-angle), 3.2054 (middle), 5.4706 (telephoto)
$r_5=10.9560$ (aspherical)
 $d_5=1.1842$ $n_5=1.58423$ $v_5=30.49$
$r_6=9.2099$ (aspherical)
 $d_6=0.9200$
$r_7=\infty$
 $d_7=12.0000$ $n_7=1.52542$ $v_7=55.78$
$r_8=\infty$
 $d_8=1.6928$
$r_9=$(intermediate imaging position)
 $d_9=-0.1000$
$r_{10} 9.3528$
 $d_{10}=19.0317$ $n_{10}=1.52542$ $v_{10}=55.78$
$r_{11}=\infty$
 $d_{11}=1.3726$
$r_{12}=16.2614$ (aspherical)
 $d_{12}=2.9197$ $n_{12}=1.49241$ $v_{12}=57.66$
$r_{13}=-12.9345$
 $d_{13}=15.9200$
$r_{14}$ (eyepoint)

Figure 13A:
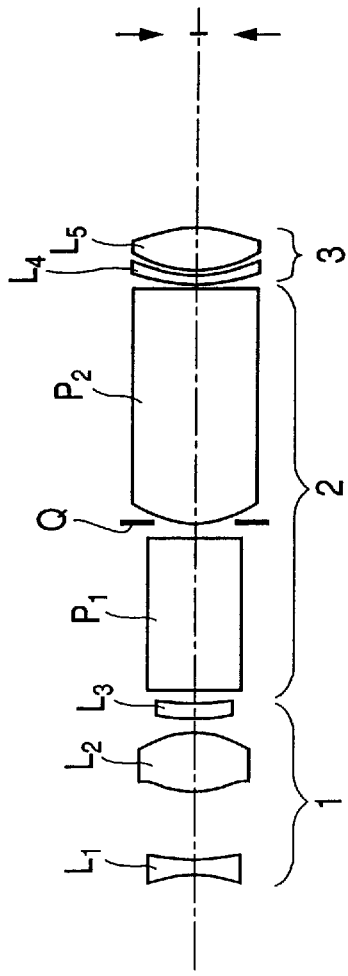
FIGS. 13A, 13B, and 13C are sectional views showing arrangements, developed along the optical axis, at wide-angle, middle, and telephoto positions, respectively, of the real image mode variable magnification finder of a tenth embodiment in the present invention.
Figure 13B:
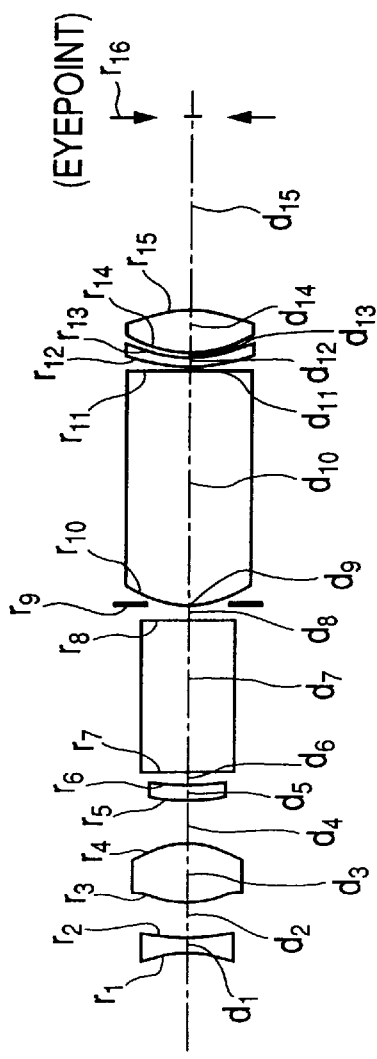
Figure 13C:
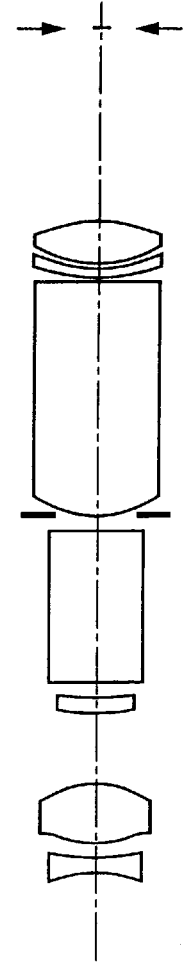

Conic Constants and Aspherical Coefficients
Third Surface
 K=−0.0082
 $A_4=-5.7132\times10^{-4}$ $A_6=3.7691\times10^{-5}$,
 $A_8=-1.7599\times10^{-6}$, $A_{10}=1.5709\times10^{-7}$
Fourth Surface
 K=0.0191
 $A_4=1.2854\times10^{-3}$, $A_6=3.4654\times10^{-5}$,
 $A_8=-1.4303\times10^{-6}$, $A_{10}=4.6531\times10^{-7}$
Fifth Surface
 K=−0.0049
 $A_4=-1.9952\times10^{-4}$, $A_6=2.9721\times10^{-5}$,
 $A_8=-1.1811\times10^{-6}$, $A_{10}=-8.7220\times10^{-7}$
Sixth Surface
 K=0.1150
 $A_4=-3.0334\times10^{-4}$, $A_6=1.2898\times10^{-4}$,
 $A_8=-3.3969\times10^{-6}$, $A_{10}=-1.5209\times10^{-6}$
Twelfth Surface
 K=−2.1506
 $A_4=-1.5481\times10^{-4}$, $A_6=3.2192\times10^{-6}$,
 $A_8=-4.4864\times10^{-8}$, $A_{10}=-9.4982\times10^{-11}$ Tenth Embodiment The real image mode variable magnification finder of this embodiment, as shown in FIGS. 13A, 13B, and 13C, includes, in order from the object side, the objective optical system 1 composed of the first lens unit $L_1$ with negative power, the second lens unit $L_2$ with positive power, and the third lens unit $L_3$ with negative power; the image erecting means 2 composed of the prisms $P_1$ and $P_2$; and the ocular optical system 3 composed of the eyepieces $L_4$ and $L_5$. The finder of the tenth embodiment uses the ocular optical system 3 constructed with two eyepieces $L_4$ and $L_5$, and thereby axial chromatic aberration can be favorably corrected.

In the finder of the tenth embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second lens unit $L_2$ is simply moved along the optical axis toward the object side. The third lens unit $L_3$ is fixed. With the exception of this construction, the tenth embodiment has the same arrangement as the sixth embodiment.

Various numerical data relative to the real image mode variable magnification finder of the tenth embodiment are shown below.

| | |
|---|---|
| Finder magnification | 0.56x–0.79x–1.00x |
| Variable magnification Ratio | 1.79 |
| Angle of incidence ω | 24.6°–16.4°–12.8° |
| Pupil diameter φ | 5 mm |

$f_W=7.857$ $\beta_W Z/D_W=0.0737$ $\omega'=13.372$ $f_R=14.081$ $\beta_W=0.557$ $L/f_W=1.803$ $E_{nW}/D_W=0.288$ $(r_4+r_3)/(r_4-r_3)=0.25$ $r_1=-9.4301$
 $d_1=1.0111$ $n_1=1.58423$ $\nu_1=30.49$
$r_2=13.4405$
 $d_2=5.5709$ (wide-angle), 2.7280 (middle), 1.3556 (telephoto)
$r_3=6.7170$ (aspherical)
 $d_3=4.6317$ $n_3=1.52542$ $\nu_3=55.78$
$r_4=-7.0589$ (aspherical)
 $d_4=0.9916$ (wide-angle), 3.4562 (middle), 5.5930 (telephoto)
$r_5=14.2395$ (aspherical)
 $d_5=1.3268$ $n_5=1.58423$ $\nu_5=30.49$
$r_6=10.8131$ (aspherical)
 $d_6=0.9200$
$r_7=\infty$
 $d_7=12.0000$ $n_7=1.52542$ $\nu_7=55.78$
$r_8=\infty$
 $d_8=1.2456$
$r_9=\infty$ (intermediate imaging position)
 $d_9=-0.1000$
$r_{10}=9.0451$
 $d_{10}=18.0202$ $n_{10}=1.52542$ $\nu_{10}=55.78$
$r_{11}=\infty$
 $d_{11}=0.3000$
$r_{12}=14.7188$
 $d_{12}=0.6654$ $n_{12}=1.58423$ $\nu_{12}=30.49$
$r_{13}=9.3949$
 $d_{13}=0.4000$
$r_{14}=8.1059$ (aspherical)
 $d_{14}=3.3791$ $n_{14}=1.49241$ $\nu_{14}=57.66$
$r_{15}=-13.8171$
 $d_{15}=14.4500$
$r_{16}$ (eyepoint)

Figure 14A:
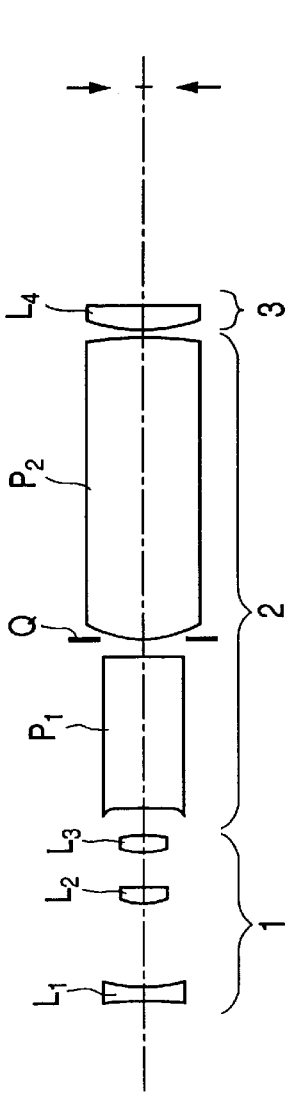
FIGS. 14A, 14B, and 14C are sectional views showing arrangements, developed along the optical axis, at wide-angle, middle, and telephoto positions, respectively, of the real image mode variable magnification finder of an eleventh embodiment in the present invention.
Figure 14B:
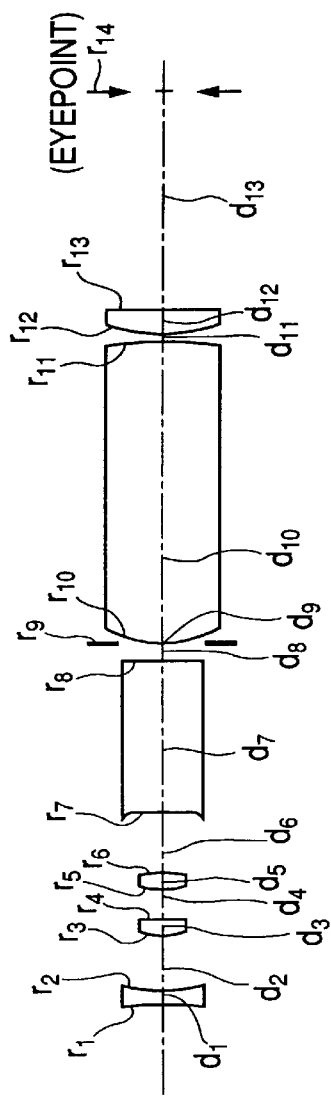
Figure 14C:
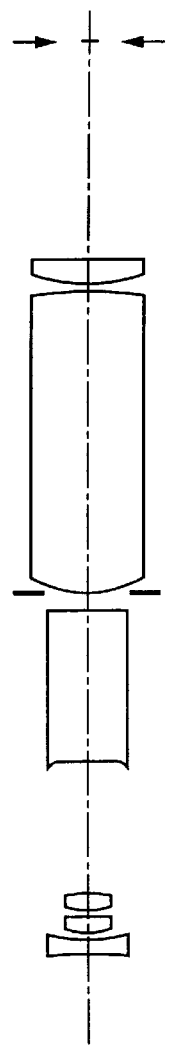

Conic Constants and Aspherical Coefficients
Third Surface
 $K=0.0173$
 $A_4=-1.1593\times10^{-3}$, $A_6=-2.6573\times10^{-5}$,
 $A_8=1.6992\times10^{-6}$, $A_{10}=-1.8168\times10^{-7}$
Fourth Surface
 $K=0.0195$
 $A_4=4.1582\times10^{-4}$, $A_6=-3.0760\times10^{-5}$,
 $A_8=1.5584\times10^{-6}$, $A_{10}=-9.1562\times10^{-8}$
Fifth Surface
 $K=-0.0193$
 $A_4=-6.5796\times10^{-4}$, $A_6=-2.7638\times10^{-5}$,
 $A_8=1.6259\times10^{-5}$, $A_{10}=-1.7883\times10^{-6}$
Sixth Surface
 $K=0.1287$
 $A_4=-7.3665\times10^{-4}$, $A_6=5.2082\times10^{-5}$,
 $A_8=1.4620\times10^{-5}$, $A_{10}=-2.0208\times10^{-6}$
Fourteenth Surface
 $K=-1.7732$
 $A_4=7.6205\times10^{-5}$, $A_6=1.8825\times10^{-6}$,
 $A_8=1.6867\times10^{-8}$, $A_{10}=-8.9258\times10^{-10}$ Eleventh Embodiment The real image mode variable magnification finder of this embodiment, as shown in FIGS. 14A, 14B, and 14C, has almost the same arrangement as that of the first embodiment, but is constructed so that the finder magnification is made somewhat lower to obtain the angle of emergence larger than those of other embodiments.

In the finder of the eleventh embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second and third lens units $L_2$ and $L_3$ are simply moved along the optical axis toward the object side.

The following are various numerical data relative to the real image mode variable magnification finder of the eleventh embodiment.

| | |
|---|---|
| Finder magnification | 0.43x–0.62x–1.01x |
| Variable magnification Ratio | 2.35 |
| Angle of incidence ω | 25.9°–17.2°–10.4° |
| Pupil diameter φ | 4 mm |

$f_W=7.330$ $\beta_W/D_W=0.0742$ $\omega'=12.05$ $f_R=17.136$ $\beta_W=0.431$ $L/f_W=2.276$ $E_{nW}/D_W=0.401$ $r_1=-20.8547$
 $d_1=0.8455$ $n_1=1.58423$ $\nu_1=30.49$
$r_2=9.5460$ (aspherical)
 $d_2=7.0945$ (wide-angle), 3.4544 (middle), 0.7065 (telephoto)
$r_3=9.1287$ (aspherical)
 $d_3=1.2708$ $n_3=1.49241$ $\nu_3=57.66$
$r_4=134.8690$
 $d_4=2.9630$ (wide-angle), 2.5256 (middle), 0.7863 (telephoto)
$r_5=14.2838$
 $d_5=1.4317$ $n_5=1.49241$ $\nu_5=57.66$
$r_6=-11.5139$ (aspherical)

$d_6$=2.1845 (wide-angle), 5.1436 (middle), 10.7429 (telephoto)

$r_7$=44.8471 (aspherical)

$d_7$=13.0000 $n_7$=1.52542 $v_7$=55.78

$r_8$=∞

$d_8$=1.5000

$r_9$=∞ (intermediate imaging position)

$d_9$=0

$r_{10}$=9.7294

$d_{10}$=25.2584 $n_{10}$=1.52542 $v_{12}$=55.78

$r_{11}$=−38.8640

$d_{11}$=0.5331

$r_{12}$=11.7943 (aspherical)

$d_{12}$=2.2333 $n_{12}$=1.52542 $v_{12}$=55.78

$r_{13}$=−782.9968

$d_{13}$=18.0423

$r_{14}$ (eyepoint)

Conic Constants and Aspherical Coefficients

Second Surface

K=−15.4154

$A_4$=1.3441×10$^{-3}$, $A_6$=−8.3582×10$^{-5}$, $A_8$=3.5629×10$^{-6}$, $A_{10}$=−7.5913×10$^{-8}$

Third Surface

K=1.2541

$A_4$−1.1785×10$^{-3}$, $A_6$=3.4215×10$^{-5}$, $A_8$=−4.7144×10$^{-6}$, $A_{10}$=1.7339×10$^{-7}$

Sixth Surface

K=−5.9059

$A_4$=−1.9955×10$^{-4}$, $A_6$=−3.2089×10$^{-5}$, $A_8$=2.3699×10$^{-6}$, $A_{10}$=−3.6817×10$^{-8}$

Seventh Surface

K=21.7319

$A_4$=−1.7479×10$^{-4}$, $A_6$=−2.5396×10$^{-4}$, $A_8$=9.3616×10$^{-5}$, $A_{10}$=−9.4803×10$^{-6}$

Twelfth Surface

K=0.9977

$A_4$=−1.9591×10$^{-4}$, $A_6$=−3.2572×10$^{-6}$, $A_8$=1.3829×10$^{-7}$, $A_{10}$=−2.6559×10$^{-9}$

Twelfth Embodiment

Figure 15A:
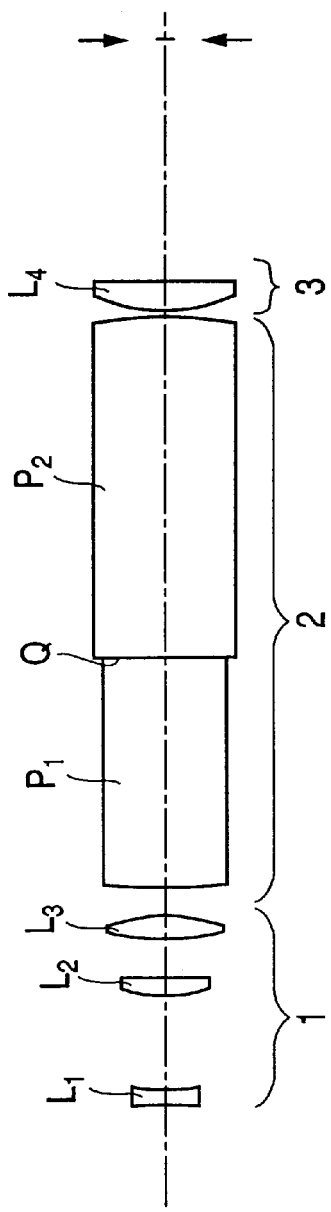
FIGS. 15A, 15B, and 15C are sectional views showing arrangements, developed along the optical axis, at wide-angle, middle, and telephoto positions, respectively, of the real image mode variable magnification finder of a twelfth embodiment in the present invention.
Figure 15B:
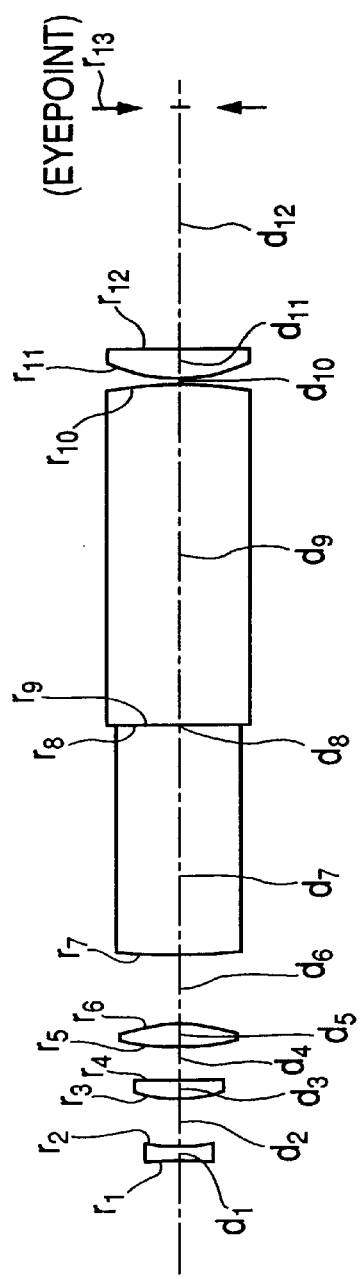
Figure 15C:
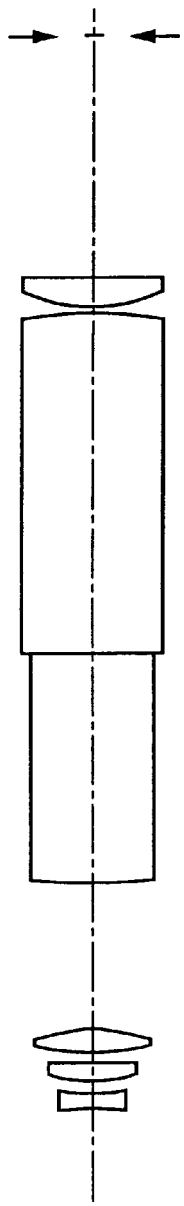

The real image mode variable magnification finder of this embodiment, as shown in FIGS. 15A, 15B, and 15C, includes, in order from the object side, the objective optical system 1 composed of the first lens unit $L_1$ with negative power, the second lens unit $L_2$ with positive power, and the third lens unit $L_3$ with positive power; the image erecting means 2 composed of prisms $P_1$ and $P_2$; and the ocular optical system 3 of the eyepiece $L_4$. In the objective optical system 1 in particular, each of the lens units with negative, positive, and positive powers is constructed with a single lens, and field components (the exit surface of the prism $P_1$ and the entrance surface of the prism $P_2$) is made powerless. The image erecting means 2 is such that the prisms $P_1$ and $P_2$ are integrally configured.

In the finder of the twelfth embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second and third lens units $L_2$ and $L_3$ are simply moved along the optical axis toward the object side.

Figure 16:
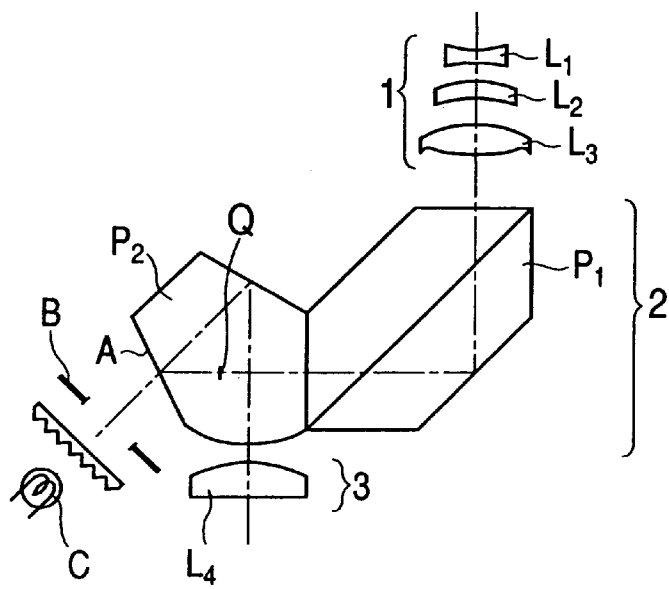
FIG. 16 is a view showing a specific example of an image erecting means in the twelfth embodiment.

Here, the arrangement and function of the image erecting means 2 will be explained in detail below with reference to FIG. 16. A light beam passing through the objective optical system 1 is such that a field image is upside down in the roof prism $P_1$, and the optical path, after being bent by 90°, is introduced into the pentaprism $P_2$. The light beam introduced into the pentaprism $P_2$ is twice-reflected here to further invert the field image, and is introduced into the ocular optical system 3.

In the pentaprism $P_2$, a surface A is a semi-transmissive surface, which, as in an ordinary pentaprism, reflects the light beam derived from the objective optical system to contribute to the inversion of the field image, and in addition, is capable of introducing the images of a field frame and a target mark through light from the exterior. Reference symbol B represents a member indicating the field information of the finder, such as the field frame and the target mark. The member B is located at a position optically equivalent to the intermediate imaging plane Q. Reference symbol C denotes an illumination means for the indicating member B. The illumination means C may be constructed with either an illuminating window or a light-emitting element.

With the image erecting means 2 thus constructed, the intermediate imaging position Q is situated within the pentaprism $P_2$, and hence there is no problem such that dust particles attached to the finder would be seen in sharp focus, even though the magnifier magnification of the ocular optical system is high.

The following are various numerical data relative to the real image mode variable magnification finder of the twelfth embodiment.

| | |
|---|---|
| Finder magnification | 0.49x–0.68x–1.03x |
| Variable magnification Ratio | 2.10 |
| Angle of incidence ω | 25.9°–17.2°–10.4° |
| Pupil diameter φ | 4 mm |

$f_W$=8.281

$\beta_W Z/D_W$=0.0732

ω=12.05

$f_R$=17.002

$\beta_W$=0.487

$L/f_W$=2.387

$E_{nW}/D_W$=0.193

$r_1$=−27.6496

$d_1$=1.0566 $n_1$=1.58423 $v_1$=30.49

$r_2$=10.6271 (aspherical)

$d_2$=7.0003 (wide-angle), 3.4727 (middle), 0.8225 (telephoto)

$r_3$=10.6401 (aspherical)

$d_3$=1.3188 $n_3$=1.49241 $v_3$=57.66

$r_4$=61.9156

$d_4$=2.9740 (wide-angle), 2.5182 (middle), 0.8960 (telephoto)

$r_5$=16.5339

$d_5$=1.7582 $n_5$=1.49241 $v_5$=57.66

$r_6$=−11.8504 (aspherical)

$d_6$=2.0417 (wide-angle), 5.1219 (middle), 10.7127 (telephoto)

$r_7 = 29.0315$ (aspherical)
   $d_7 = 17.7254$  $n_7 = 1.52542$  $v_7 = 55.78$
$r_8 = \infty$ (intermediate image position)
   $d_8 = 0$
$r_9 = 966.4284$
   $d_9 = 25.1705$  $n_9 = 1.52542$  $v_9 = 55.78$
$r_{10} = -38.8640$
   $d_{10} = 0.4203$
$r_{11} = 11.3582$ (aspherical)
   $d_{11} = 2.2535$  $n_{11} = 1.52542$  $v_{11} = 55.78$
$r_{12} = 682.0047$
   $d_{12} = 18.0686$
$r_{13}$ (eyepoint)

Figure 17:
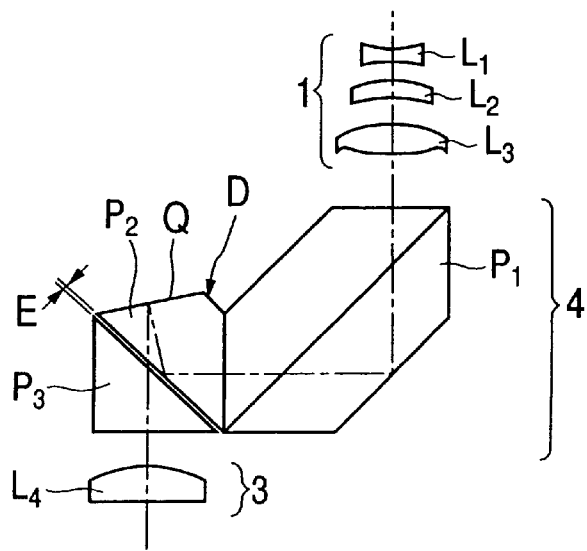
FIG. 17 is a view showing another example of the image erecting means in the twelfth embodiment.

Conic Constants and Aspherical Coefficients
Second Surface
   $K = -15.4152$
   $A_4 = 9.4512 \times 10^{-4}$, $A_6 = -5.6294 \times 10^{-5}$,
   $A_8 = 1.6416 \times 10^{-5}$, $A_{10} = -1.1763 \times 10^{-6}$
Third Surface
   $K = 1.2543$
   $A_4 = -9.9621 \times 10^{-4}$, $A_6 = 6.9500 \times 10^{-5}$,
   $A_8 = 3.6228 \times 10^{-6}$, $A_{10} = -1.8403 \times 10^{-7}$
Sixth Surface
   $K = -5.9055$
   $A_4 = -4.8765 \times 10^{-4}$, $A_6 = 5.9548 \times 10^{-5}$,
   $A_8 = -2.4749 \times 10^{-6}$, $A_{10} = 6.7913 \times 10^{-8}$
Seventh Surface
   $K = 21.7318$
   $A_4 = -1.3853 \times 10^{-4}$, $A_6 = -3.8638 \times 10^{-5}$,
   $A_8 = 4.7901 \times 10^{-6}$, $A_{10} = -1.4494 \times 10^{-7}$
Eleventh Surface
   $K = 0.9975$
   $A_4 = -2.0417 \times 10^{-4}$, $A_6 = 1.0477 \times 10^{-5}$,
   $A_8 = -5.4560 \times 10^{-7}$, $A_{10} = 6.8380 \times 10^{-9}$ The real image mode variable magnification finder of the twelfth embodiment, as illustrated in FIG. 17, may use an image erecting means 4 constructed with three prisms $P_1$, $P_2$, and $P_3$. In the image erecting means 4, the roof prism $P_1$ is configured integrally with the prism $P_2$, and the prisms $P_2$ and $P_3$ are arranged with a narrow space E between them. An air layer lies in the space E.

In the image erecting means 4, a light beam passing through the objective optical system 1 is incident on the roof prism $P_1$ so that the field image is upside down, and the optical path, after being bent by 90°, is introduced into the prism $P_2$ which is configured like a trigonal pyramid. The light beam introduced into the prism $P_2$ is further reflected toward the object side and is conducted to a surface D. The prism $P_2$ is positioned so that the surface D coincides with the intermediate imaging position Q. Patterns indicating field information, such as the field frame and the target mark, are engraved on the margin of the surface D. In this way, the reflecting condition of the light beam varies with a place where the patterns are present or absent on the surface D, and when the observer looks through the finder, he can recognize various kinds of information. Subsequently, the light beam reflected by the surface D passes through the prism $P_3$ and the ocular optical system 3 and then reaches the pupil.

In general, fine dust particles adhere to the prism surface, but with the image erecting means 4, they will not be acquired as finder information. Hence, there is no problem that dust particles adhering to the vicinity of the field frame of the finder are seen in sharp focus. Moreover, as mentioned above, the prism $P_1$ is configured integrally with the prism $P_2$, and thus the number of parts can be reduced.

Thirteenth Embodiment

The real image mode variable magnification finder of this embodiment, as shown in FIGS. 18A, 18B, and 18C, has almost the same arrangement as that of the sixth embodiment, but is designed so that the objective optical system 1 has the smallest possible size. In the finder of the thirteenth embodiment, when the magnification is changed in the range from the wide-angle position to the telephoto position, the first and second lens units $L_1$ and $L_2$ are simply moved along the optical axis toward the object side. The third lens unit $L_3$ remains fixed.

The following are various numerical data relative to the real image mode variable magnification finder of the thirteenth embodiment.

| Finder magnification | 0.50x–0.72x–0.90x |
|---|---|
| Variable magnification Ratio | 1.80 |
| Angle of incidence ω | 24.6°–16.4°–12.8° |
| Pupil diameter φ | 5 mm |

$f_W = 7.803$ $\beta_W Z / D_W = 0.0808$ $\omega' = 11.873$ $f_R = 15.608$ $\beta_W = 0.503$ $L / f_W = 1.702$ $E_{nW} / D_W = 0.234$ $(r_4 + r_3)/(r_4 - r_3) = 0.276$ $r_1 = -7.0651$
   $d_1 = 1.0006$  $n_1 = 1.58423$  $v_1 = 30.49$
$r_2 = 18.2161$
   $d_2 = 4.562$ (wide-angle), 2.345 (middle), 1.274 (telephoto)
$r_3 = 5.3244$ (aspherical)
   $d_3 = 3.3465$  $n_3 = 1.52542$  $v_3 = 55.78$
$r_4 = -9.3855$ (aspherical)
   $d_4 = 0.6000$ (wide-angle), 3.406 (middle), 5.868 (telephoto)
$r_5 = 10.3934$ (aspherical)
   $d_5 = 1.6456$  $n_5 = 1.58423$  $v_5 = 30.49$
$r_6 = 9.3913$ (aspherical)
   $d_6 = 0.9923$
$r_7 = \infty$
   $d_7 = 10.7761$  $n_7 = 1.52542$  $v_7 = 55.78$
$r_8 = \infty$
   $d_8 = 1.5125$
$r_9 = \infty$ (intermediate imaging position)
   $d_9 = -0.1000$
$r_{10} = 8.9577$
   $d_{10} = 20.2534$  $n_{10} = 1.52542$  $v_{10} = 55.78$
$r_{11} = \infty$
   $d_{11} = 1.2903$
$r_{12} = 14.2400$ (aspherical)
   $d_{12} = 2.7946$  $n_{12} = 1.49241$  $v_{12} = 57.66$
$r_{13} = -15.6165$
   $d_{13} = 15.9201$
$r_{14}$ (eyepoint)

Figure 19A:
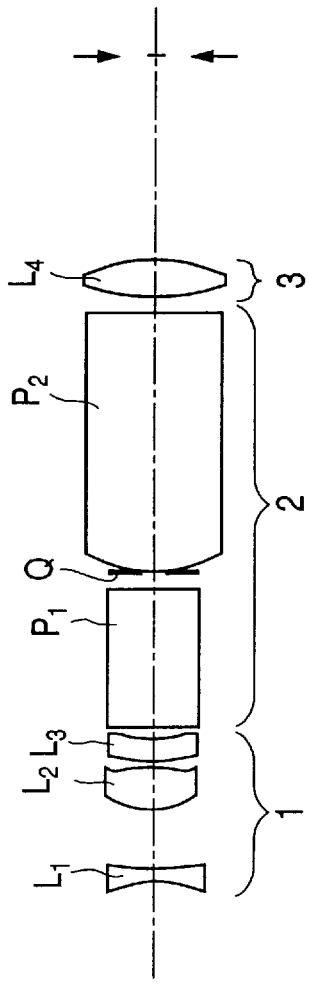
FIGS. 19A, 19B, and 19C are sectional views showing arrangements, developed along the optical axis, at wide-angle, middle, and telephoto positions, respectively, of the real image mode variable magnification finder of a fourteenth embodiment in the present invention.
Figure 19B:
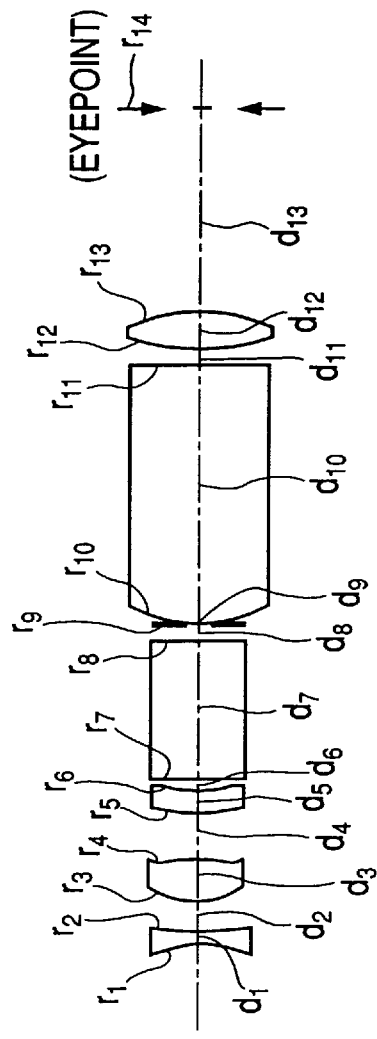
Figure 19C:
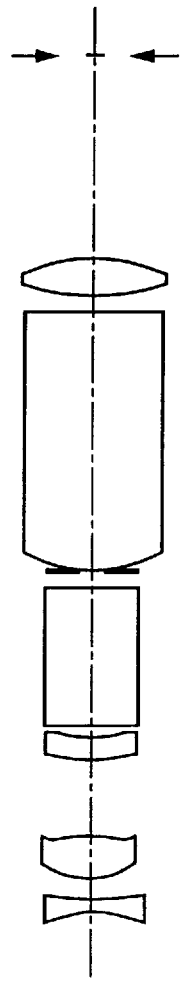

Conic Constants and Aspherical Coefficients
Third Surface
K=−0.0052
$A_4$=−6.1645×10$^{-4}$, $A_6$=8.7460×10$^{-5}$,
$A_8$=−6.5747×10$^{-6}$, $A_{10}$=5.2712×10$^{-7}$
Fourth Surface
K=0.0212
$A_4$=1.4315×10$^{-3}$, $A_6$=9.0858×10$^{-5}$,
$A_8$=−9.3088×10$^{-6}$, $A_{10}$=1.3704×10$^{-6}$
Fifth Surface
K=−0.0079
$A_4$=−2.8448×10$^{-4}$, $A_6$=−3.8411×10$^{-5}$,
$A_8$=8.5221×10$^{-6}$, $A_{10}$=−7.0129×10$^{-7}$
Sixth Surface
K=0.1306
$A_4$=1.2329×10$^{-4}$, $A_6$=−1.1992×10$^{-4}$,
$A_8$=3.4533×10$^{-5}$, $A_{10}$=−2.6934×10$^{-6}$
Twelfth Surface
K=−2.3828
$A_4$=−5.7708×10$^{-5}$, $A_6$=1.0196×10$^{-6}$,
$A_8$=−1.6073×10$^{-8}$, $A_{10}$=−3.0850×10$^{-11}$ Fourteenth Embodiment The real image mode variable magnification finder of this embodiment, as shown in FIGS. 19A, 19B, and 19C, has almost the same arrangement as that of the sixth embodiment, but is designed to achieve compactness of the objective optical system 1 and have a larger angle of emergence. In the finder of the fourteenth embodiment, when the magnification is changed in the range from the wide-angle position to the telephoto position, the first and second lens units $L_1$ and $L_2$ are simply moved along the optical axis toward the object side. The third lens unit $L_3$ remains fixed.

The following are various numerical data relative to the real image mode variable magnification finder of the fourteenth embodiment.

| Finder magnification | 0.50x–0.72x–0.90x |
|---|---|
| Variable magnification Ratio | 1.80 |
| Angle of incidence ω | 24.6°–16.4°–12.8° |
| Pupil diameter φ | 5 mm |

$f_W$=7.802

$\beta_W Z/D_W$=0.0783

ω'=12.153

$f_R$=15.608

$\beta_W$=0.503

$L/f_W$=1.700

$E_{nW}/D_W$=0.227

$(r_4+r_3)/(r_4-r_3)$=0.276

$r_1$=−7.0365
  $d_1$=1.0887 $n_1$=1.58423 $v_1$=30.49
$r_2$=17.6314
  $d_2$=4.543 (wide-angle), 2.347 (middle), 1.287 (telephoto)
$r_3$=5.3151 (aspherical)
  $d_3$=3.5185 $n_3$=1.52542 $v_3$=55.78
$r_4$=−9.3705 (aspherical)
  $d_4$=0.6000 (wide-angle), 3.463 (middle), 5.955 (telephoto)
$r_5$=10.9092 (aspherical)
  $d_5$=1.7583 $n_5$=1.58423 $v_5$=30.49
$r_6$=9.7870 (aspherical)
  $d_6$=0.9591
$r_7$=∞
  $d_7$=10.8399 $n_7$=1.52542 $v_7$=55.78
$r_8$=∞
  $d_8$=1.4650
$r_9$=∞ (intermediate imaging position)
  $d_9$=−0.1000
$r_{10}$=9.0895
  $d_{10}$=20.1937 $n_{10}$=1.52542 $v_{10}$=55.78
$r_{11}$=∞
  $d_{11}$=1.3171
$r_{12}$=14.3834 (aspherical)
  $d_{12}$=2.7961 $n_{12}$=1.49241 $v_{12}$=57.66
$r_{13}$=−15.4463
  $d_{13}$=16.1201
$r_{14}$ (eyepoint)

Figure 20A:
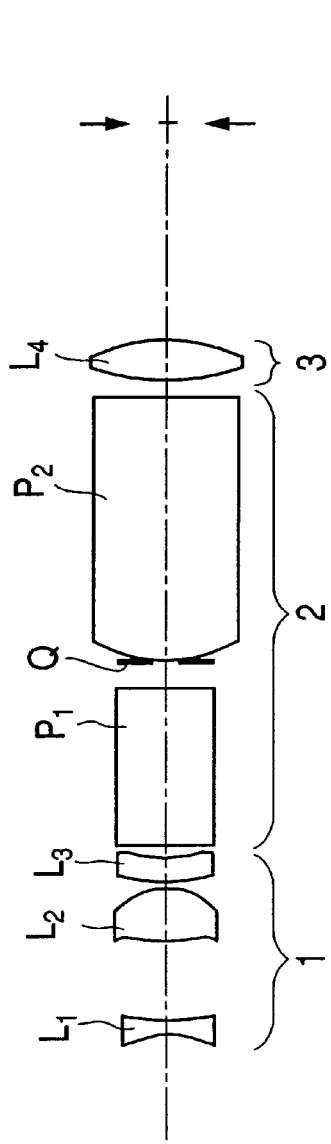
FIGS. 20A, 20B, and 20C are sectional views showing arrangements, developed along the optical axis, at wide-angle, middle, and telephoto positions, respectively, of the real image mode variable magnification finder of a fifteenth embodiment in the present invention.
Figure 20B:
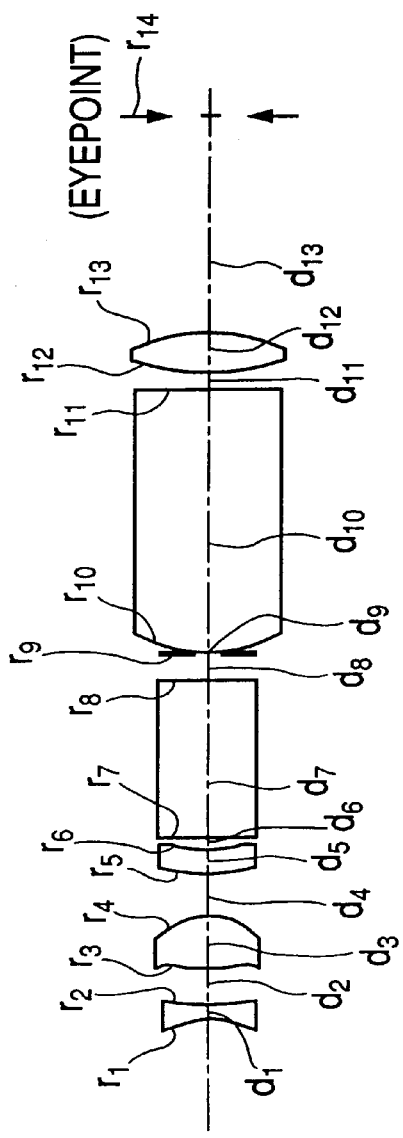
Figure 20C:
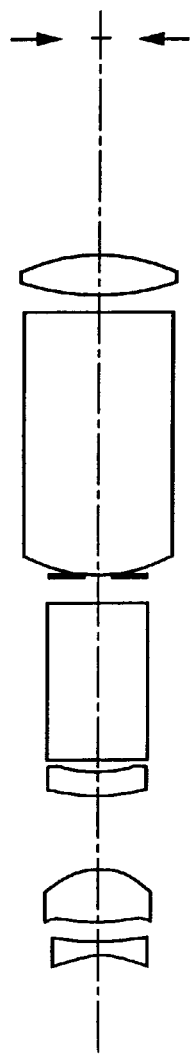

Conic Constants and Aspherical Coefficients
Third Surface
K=−0.0026
$A_4$=−7.0719×10$^{-4}$, $A_6$=6.9491×10$^{-5}$,
$A_8$=−4.6367×10$^{-6}$, $A_{10}$=3.6033×10$^{-7}$
Fourth Surface
K=0.0224
$A_4$=1.3650×10$^{-3}$, $A_6$=6.2164×10$^{-5}$,
$A_8$=−4.4613×10$^{-6}$, $A_{10}$=8.7558×10$^{-7}$
Fifth Surface
K=−0.0095
$A_4$=1.4093×10$^{-4}$, $A_6$=−1.6475×10$^{-4}$,
$A_8$=3.3235×10$^{-5}$, $A_{10}$=−2.3865×10$^{-6}$
Sixth Surface
K=0.1370
$A_4$=5.4346×10$^{-4}$, $A_6$=−2.0183×10$^{-4}$,
$A_8$=4.8855×10$^{-5}$, $A_{10}$=−3.5161×10$^{-6}$
Twelfth Surface
K=−2.4686
$A_4$=−5.0973×10$^{-5}$, $A_6$=5.0429×10$^{-7}$,
$A_8$=1.3346×10$^{-8}$, $A_{10}$=−5.2601×10$^{-10}$ Fifteenth Embodiment The real image mode variable magnification finder of this embodiment, as shown in FIGS. 20A, 20B, and 20C, has almost the same arrangement as that of the sixth embodiment, but is designed so that the entire length of the objective optical system 1 is relatively long compared with those of other embodiments. This brings about a greater degree of design freedom of the image erecting means. In the finder of the fifteenth embodiment, when the magnification is changed in the range from the wide-angle position to the telephoto position, the first lens unit $L_1$ is moved along the optical axis toward the pupil side in the range from the wide-angle position to the vicinity of the middle position, and toward the object side in the range from the vicinity of the middle position to the telephoto position. The second lens unit $L_2$ is simply moved along the optical axis toward the object side. The third lens unit $L_3$ remains fixed.

The following are various numerical data relative to the real image mode variable magnification finder of the fifteenth embodiment.

| Finder magnification | 0.52x–0.74x–0.93x |
|---|---|
| Variable magnification Ratio | 1.79 |
| Angle of incidence ω | 24.6°–16.4°–12.8° |
| Pupil diameter φ | 5 mm |

$f_W$=7.802

$\beta_W Z/D_W$=0.0730

$\omega'$=11.789

$f_R$=15.062

$\beta_W$=0.520

$L/f_W$=1.915

$E_{nW}/D_W$=0.279

$(r_4+r_3)/(r_4-r_3)$=−0.283

$r_1$=9.1505
  $d_1$=0.9255 $n_1$=1.58423 $v_1$=30.49
$r_2$=15.9413
  $d_2$=5.726 (wide-angle), 2.765 (middle), 1.332 (telephoto)
$r_3$=10.4761 (aspherical)
  $d_3$=4.0350 $n_3$=1.52542 $v_3$=55.78
$r_4$=−5.8587 (aspherical)
  $d_4$=0.592 (wide-angle), 3.170 (middle), 5.480 (telephoto)
$r_5$=8.3407 (aspherical)
  $d_5$=1.4749 $n_5$=1.58423 $v_5$=30.49
$r_6$=7.0769 (aspherical)
  $d_6$=0.9512
$r_7$=∞
  $d_7$=12.0000 $n_7$=1.52542 $v_7$=55.78
$r_8$=∞
  $d_8$=1.9886
$r_9$=∞ (intermediate imaging position)
  $d_9$=−0.1000
$r_{10}$=9.9922
  $d_{10}$=18.9330 $n_{10}$=1.52542 $v_{10}$=55.78
$r_{11}$=∞
  $d_{11}$=1.3841
$r_{12}$=17.3947 (aspherical)
  $d_{12}$=2.9191 $n_{12}$=1.49241 $v_{12}$=57.66
$r_{13}$=−12.2131
  $d_{13}$=15.9201
$r_{14}$ (eyepoint)

Conic Constants and Aspherical Coefficients
Third Surface
  K=−0.0019
  $A_4$=−1.6308×10$^{-3}$, $A_6$=−5.7533×10$^{-5}$,
  $A_8$=4.3590×10$^{-6}$, $A_{10}$=−1.0068×10$^{-6}$
Fourth Surface
  K=0.0198
  $A_4$=−2.3932×10$^{-6}$, $A_6$=−3.1963×10$^{-5}$,
  $A_8$=−1.1912×10$^{-7}$, $A_{10}$=−1.1871×10$^{-7}$
Fifth Surface
  K=−0.0071
  $A_4$=3.4406×10$^{-4}$, $A_6$=1.5239×10$^{-6}$,
  $A_8$=5.3625×10$^{-6}$, $A_{10}$=−1.3708×10$^{-6}$
Sixth Surface
  K=0.1238
  $A_4$=5.8122×10$^{-4}$, $A_6$=−1.1524×10$^{-5}$,
  $A_8$=2.5240×10$^{-5}$, $A_{10}$=−4.1229×10$^{-6}$
Twelfth Surface
  K=−2.0826
  $A_4$=−1.8796×10$^{-4}$, $A_6$=3.5615×10$^{-6}$,
  $A_8$=−5.2833×10$^{-8}$, $A_{10}$=2.1222×10$^{-11}$ In the numerical data shown in the above embodiments, $r_1, r_2, \ldots$ represent radii of curvature of individual lens or prism surfaces; $d_1, d_2, \ldots$ represent thicknesses of individual lenses or prisms, or spaces therebetween; $n_1, n_2, \ldots$ represent refractive indices of individual lenses or prisms; and $v_1, v_2, \ldots$ represent Abbe's numbers of individual lenses or prisms. Also, when X is taken as the coordinate in the direction of the optical axis, Y is taken as the coordinate in the direction normal to the optical axis, K denotes a conic constant, and $A_4$, $A_6$, $A_8$, and $A_{10}$ denote aspherical coefficients, the configuration of each of the aspherical surfaces in the embodiments is expressed by the following equation:

$$X = \frac{Y^2/r}{1+\sqrt{1-(1+K)(Y/r)^2}} + A_4 Y^4 + A_6 Y^6 + A_8 Y^8 + A_{10} Y^{10}$$

In each of the above embodiments, it is assumed that Porro prisms are used as the image erecting means, but prisms other than the Porro prisms or mirrors may be used. In this case also, the arrangements of the image erecting means shown in FIGS. 16 and 17 are feasible.

Where the image erecting means is constructed with the Porro prisms, it is only necessary that the refractive indices of materials used for the prisms are about 1.5, and thus cheap plastic materials, for example, acrylic resin and Zeonex, can be used.

What is claimed is:

1. A real mode variable magnification finder comprising, in order from an object side:
    an objective optical system with positive power, including at least three lens units;
    an image erecting system; and
    an ocular optical system with positive power, said finder satisfying the following conditions:

$0.1 \geq \beta_W Z/D_W \geq 0.080$ $13.5 \text{ mm} \leq f_R \leq 17.3 \text{ mm}$ where $\beta_W$ is a magnification at a wide-angle position of said finder, Z is a variable magnification ratio of said finder, $D_W$ is an axial distance, in millimeters from an object-side surface of a first lens unit of said objective optical system to a pupil-side surface of a third lens unit thereof at the wide-angle position of said finder, and $f_R$ is a focal length of said ocular optical system of said finder.

2. A real image mode variable magnification finder comprising, in order from an object side:
    an objective optical system with positive power, including at least three lens units;
    an image erecting system; and
    an ocular optical system with positive power,
    said finder satisfying the following conditions:

$0.1 \geq \beta_W Z/D_W \geq 0.071$ $14.5° \geq \omega' \geq 11.9°$ $13.5 \text{ mm} \leq f_R \leq 17.3 \text{ mm}$ where $\beta_W$ is a magnification at a wide-angle position of aid finder, Z is a variable magnification ratio of said finder, $D_W$ is an axial distance, in millimeters, from an object-side surface of a first lens unit of said objective optical system to a pupil-side surface of a third lens unit thereof at the wide-angle position of said finder, ω' is a half angle of view of emergence at a maximum angle or view of said finder, and $f_R$ is a focal length of said ocular optical system of said finder.

3. A real image mode variable magnification finder comprising, in order from an object side:

an objective optical system with positive power, including at least three lens units;

an image erecting system; and an ocular optical system with positive power, said finder satisfying the following conditions:

$0.1 \geq \beta_W Z/D_W \geq 0.071$ $2.5 > L/f_W \geq 1.72$ $13.5 \text{ mm} \leq f_R \leq 17.3 \text{ mm}$ where $\beta_W$ is a magnification at a wide-angle position of said finder, Z is a variable magnification ratio of said finder, $D_W$ is an axial distance, in millimeters, from an object-side surface of a first lens unit of said objective optical system a pupil-side surface of a third lens unit thereof at the wide-angle position of said finder, L is a distance from the pupil-side surface of the third lens unit of said objective optical system to an intermediate imaging position at the wide-angle position of said finder, $f_W$ is a focal length of said objective optical system at the wide-angle position of said finder, and $f_R$ is a focal length of said ocular optical system of said finder.

4. A real image mode variable magnification finder comprising, in order from an object side:

an objective optical system with positive power;

image erecting means; and an ocular optical system with positive power, said finder satisfying the following conditions:

$14.5° \geq ω' \geq 11.9°$ $13.5 \leq f_R \leq 17.3$ $0.59 \geq \beta_W \geq 0.41$ where ω' is a half angle of view of emergence at a maximum angle of view of said finder, $f_R$ is a focal length of said ocular optical system of said finder, and $\beta_W$ is a magnification at a wide-angle position of said finder.

5. A real image mode variable magnification finder according to any one of claims 1–4, wherein said objective optical system includes, in order from said object side, a first lens unit with negative power, a second lens unit with positive power, and a third lens unit with positive power, and each of lens units constituting said objective optical system is constructed with a single lens.

6. A real image mode variable magnification finder according to claim 5, wherein at least said second lens unit and the third lens unit are movable when a magnification of said finder is changed.

7. A real image mode variable magnification finder according to claim 5, wherein said finder satisfies the following condition:

$0.19 < E_{nW}/D_W < 0.43$ where $E_{nW}$ is an axial distance from an object-side surface of said first lens unit of said objective optical system at the wide-angle position of said finder to a position of an entrance pupil and $D_W$ is an axial distance from an object-side surface of said first lens unit of said objective optical system to a pupil-side surface of said third lens unit thereof at the wide-angle position of said finder.

8. A real image mode variable magnification finder according to claim 7, wherein a prism whose entrance surface has a power is used and said entrance surface is configured to be aspherical.

9. A real image mode variable magnification finder according to any one of claims 1–4, wherein said ocular optical system is constructed with a single positive lens.

10. A real image mode variable magnification finder according to any one of claims 1–4, wherein said objective optical system includes, in order from said object side, a first lens unit with negative power, a second lens unit with positive power, and a third lens unit with negative power, and each of individual lens unit constituting said objective optical system is constructed with a single lens.

11. A real image mode variable magnification finder according to claim 10, wherein said finder satisfies the following condition:

$0.19 < E_{nW}/D_W < 0.43$ where $E_{nW}$ is an axial distance from an object-side surface of said first lens unit of said objective optical system at the wide-angle position of said finder to a position of an entrance pupil and $D_W$ is an axial distance from an object-side surface of said first lens unit of said objective optical system to a pupil-side surface of said third lens unit thereof at the wide-angle position of said finder.

12. A real image mode variable magnification finder according to claim 11, wherein said finder satisfies the following condition:

$-0.3 < (r_4+r_3)/(r_4-r_3) < 0.3$ where $r_3$ is a radius of curvature of an object-side surface of said second lens unit of said objective optical system and $r_4$ is a radius of curvature of a pupil-side surface thereof.

13. A real image mode variable magnification finder according to claim 12, wherein an aspherical surface is used for a pupil-side surface of said third lens unit of said objective optical system.

* * * * *